(12) United States Patent  (10) Patent No.: US 7,883,046 B2
Inman et al.  (45) Date of Patent: Feb. 8, 2011

(54) CORD REEL

(75) Inventors: Anthony D. Inman, Conway, SC (US); Michael A. Gasque, Conway, SC (US); Mark M. Rose, Myrtle Beach, SC (US)

(73) Assignee: Glendinning Marine Products, Inc., Conway, SC (US)

( * ) Notice: Subject to any disclaimer, the term of this patent is extended or adjusted under 35 U.S.C. 154(b) by 12 days.

(21) Appl. No.: 12/245,509

(22) Filed: Oct. 3, 2008

(65) Prior Publication Data

US 2010/0084500 A1 Apr. 8, 2010

(51) Int. Cl.
 *B65H 75/30* (2006.01)
 *B65H 75/38* (2006.01)
(52) U.S. Cl. .................................... 242/394; 242/390.8
(58) Field of Classification Search ................. 242/394, 242/389, 390, 390.8, 394.1, 545; 74/810.1, 74/332, 342, 7 E, 7 D; 192/93 A, 54.51, 192/54.5, 94
See application file for complete search history.

(56) References Cited

U.S. PATENT DOCUMENTS 3,977,620 A * 8/1976 Deuel ...................... 242/534.2
5,095,865 A * 3/1992 Keister .................... 123/179.5
5,836,536 A * 11/1998 Bodden .................... 242/390.5
6,669,135 B1 * 12/2003 Hartley .................... 242/390.9
6,957,668 B1 * 10/2005 Highsmith .................. 137/899
7,309,834 B1 * 12/2007 Byrd ............................ 174/53

* cited by examiner

*Primary Examiner*—William E Dondero
(74) *Attorney, Agent, or Firm*—Davis Wright Tremaine LLP; George C. Rondeau, Jr.; Heather M. Colburn

(57) ABSTRACT

A reel with a rotatable spool. The reel includes a motor coupled to a drive shaft and configured to rotate the drive shaft in a first direction and a second direction opposite the first direction. A drive assembly is disposed on the drive shaft and rotation of the drive shaft in the first direction moves the drive assembly along the drive shaft and into engagement with the spool. Rotation of the drive shaft in the second direction moves the drive assembly along the drive shaft and out of engagement with the spool. When the drive assembly is engaged with the spool, the drive assembly rotates the spool in a windup direction. When the drive assembly is out of engagement with the spool, the spool may be rotated manually in an unwind direction without encountering resistance from the motor.

24 Claims, 13 Drawing Sheets

CORD REEL

BACKGROUND OF THE INVENTION

1. Field of the Invention

The present invention is directed generally to motor driven reels for winding and storing flexible elongated structures, such as cords, hoses, tubing, cables, chains, and sheet materials.

2. Description of the Related Art

Reels include a rotatable hub or spool mounted inside a housing. Flexible elongated structures, such as conduits (e.g., electrical cords, hoses, cables, tubing, wire, etc.), sheet materials, structural cables, fencing, rebar, banding, straps, chains, and the like, may be wound about the spool for storage and unwound therefrom for use. Optionally, reels may be equipped with a retraction mechanism, such as a motor, operable to rotate the spool in a wind direction for the purposes of retracting or winding the elongated structure around the spool.

However, the elongated structure is typically unwound from the spool manually by pulling on the elongated structure causing the spool to rotate in an unwind direction opposite the wind direction. Unfortunately, when a user pulls on the elongated structure, the motor remains engaged with the spool. Thus, rotating the spool rotates the motor in a direction opposite the wind direction. In other words, to unwind the elongated structure from the spool, the motor must be "back driven." Rotating both the motor and the spool requires additional force beyond that required to rotate the spool unencumbered by the motor. In this manner, the motor may be characterized as resisting the rotation of the spool in the unwind direction. Depending upon the design of the motor and the way in which it is connected to the spool, this resistance may be substantial. Further, back driving the motor results in the creation of undesirable noise.

Therefore, it would be advantageous to disconnect the motor or other retraction mechanism from the spool when the elongated structure is unwound from the spool (i.e., during extension of the elongated structure from the reel). Likewise, it would be advantageous to reconnect the motor or other retraction mechanism to the spool when retraction of the elongated structure is desired. The present application provides these and other advantages as will be apparent from the following detailed description and accompanying figures.

BRIEF DESCRIPTION OF THE SEVERAL VIEWS OF THE DRAWING(S)

Figure 1:
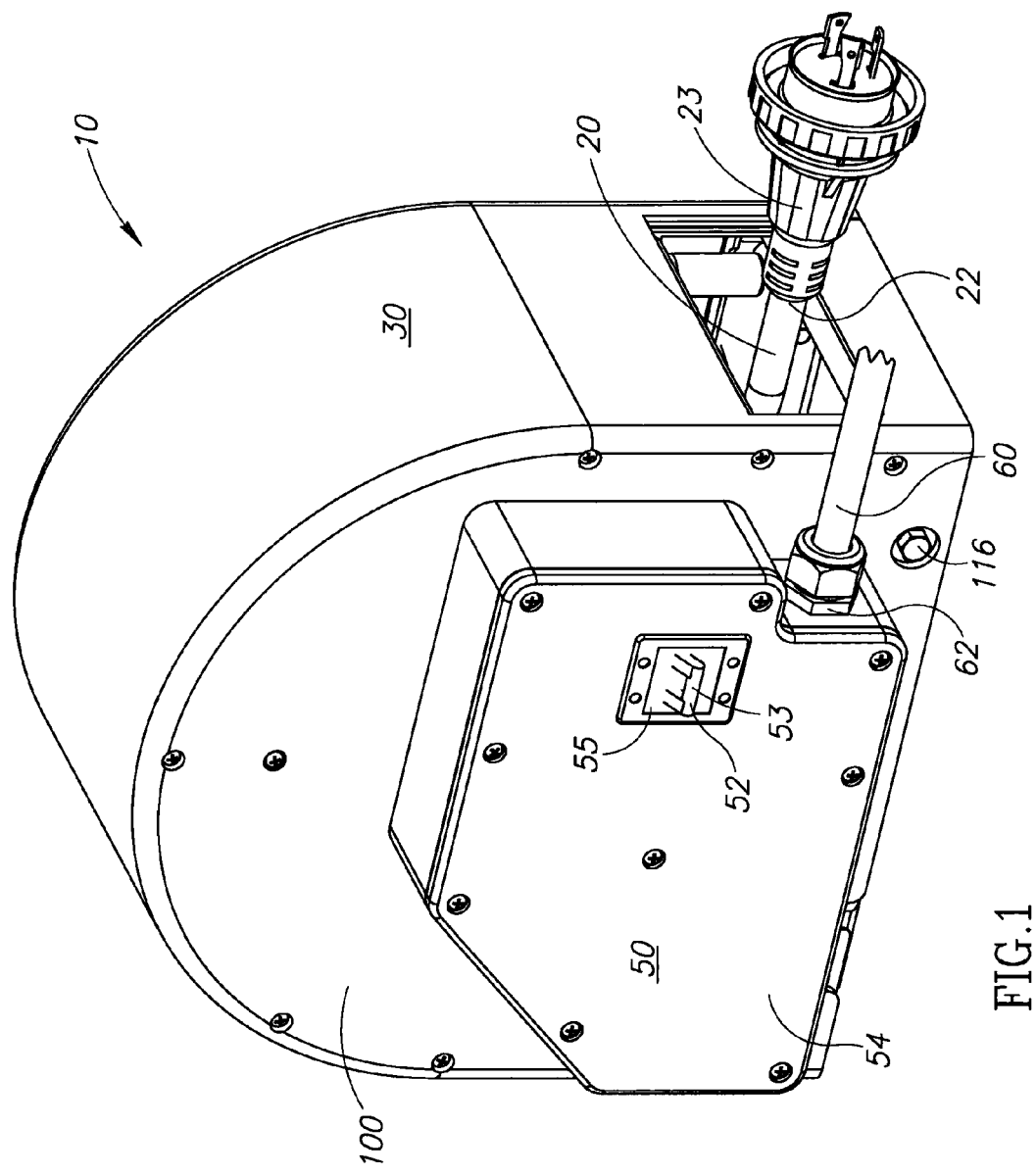
FIG. 1 is a perspective view of an exemplary embodiment of a cord reel.
Figure 7:
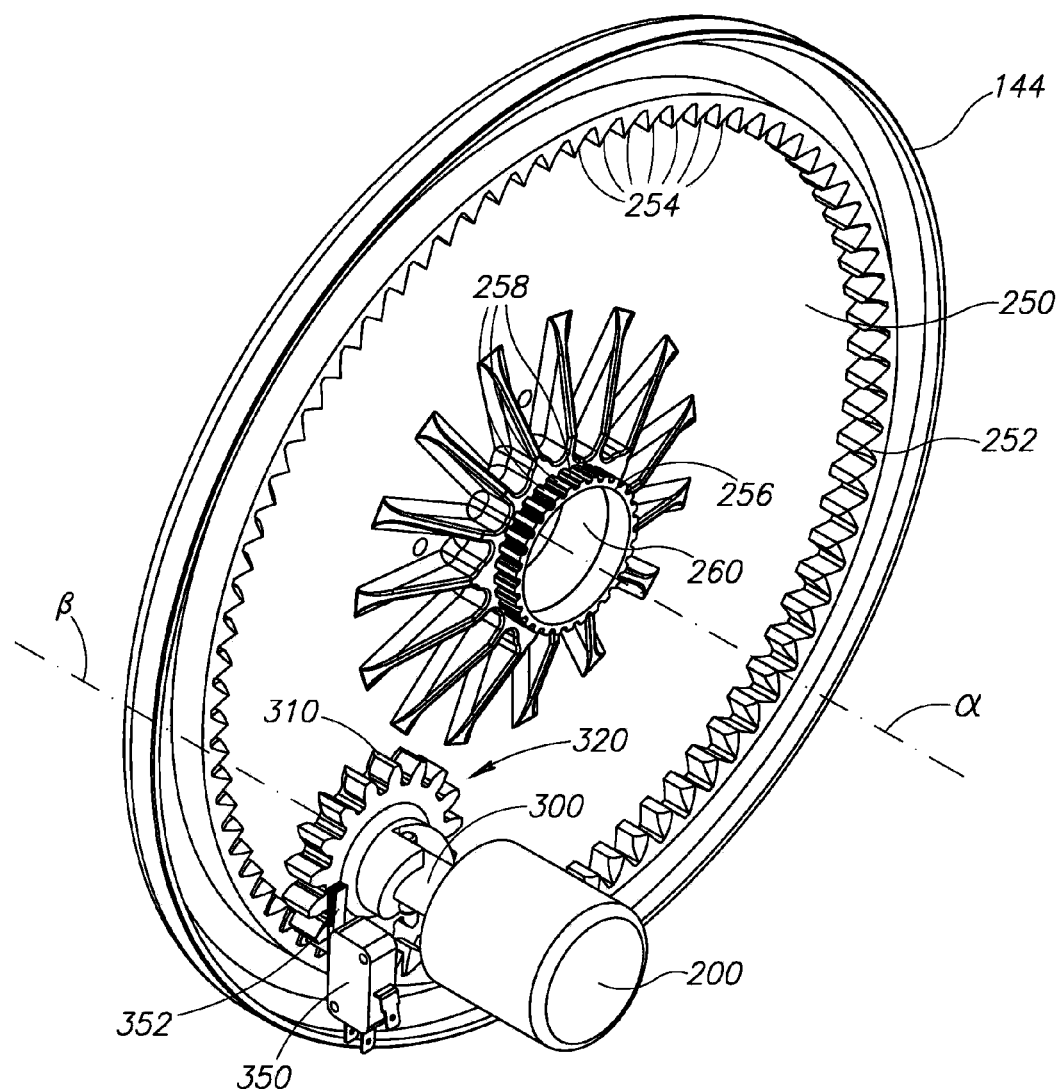

FIG. 7 is a perspective view of a motor disengagement device of the cord reel of FIG. 1, the motor disengagement device including a ring gear formed in one of the flanges of the spool, and a movable drive assembly disposed on a drive shaft rotatably coupled to a motor, the drive assembly is illustrated in a disengaged position and is configured to move along the drive shaft from the disengaged position illustrated to an engaged position.

Figure 8A:
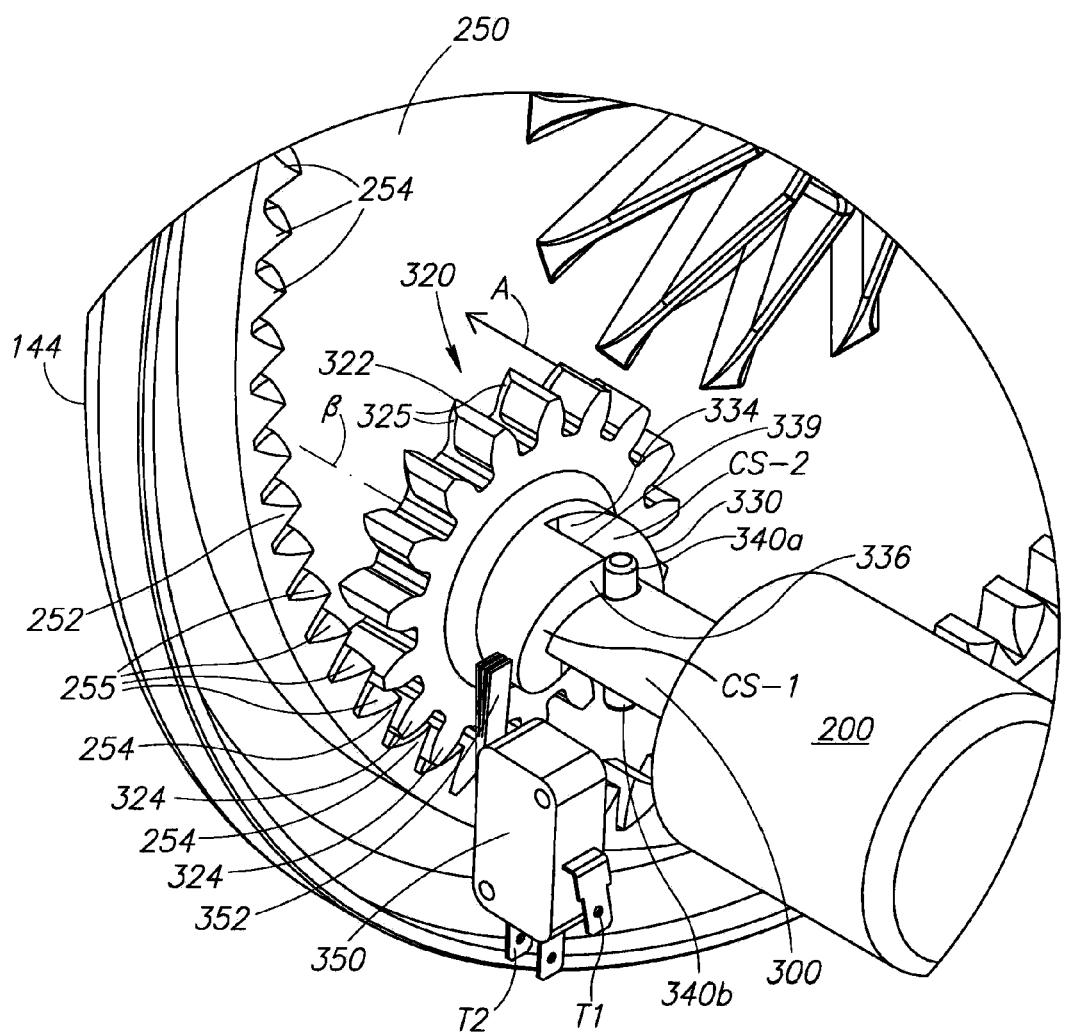

FIG. 8A is an enlarged fragmentary perspective view of the motor disengagement device of FIG. 7 with the drive assembly illustrated in the engaged position.

Figure 8B:
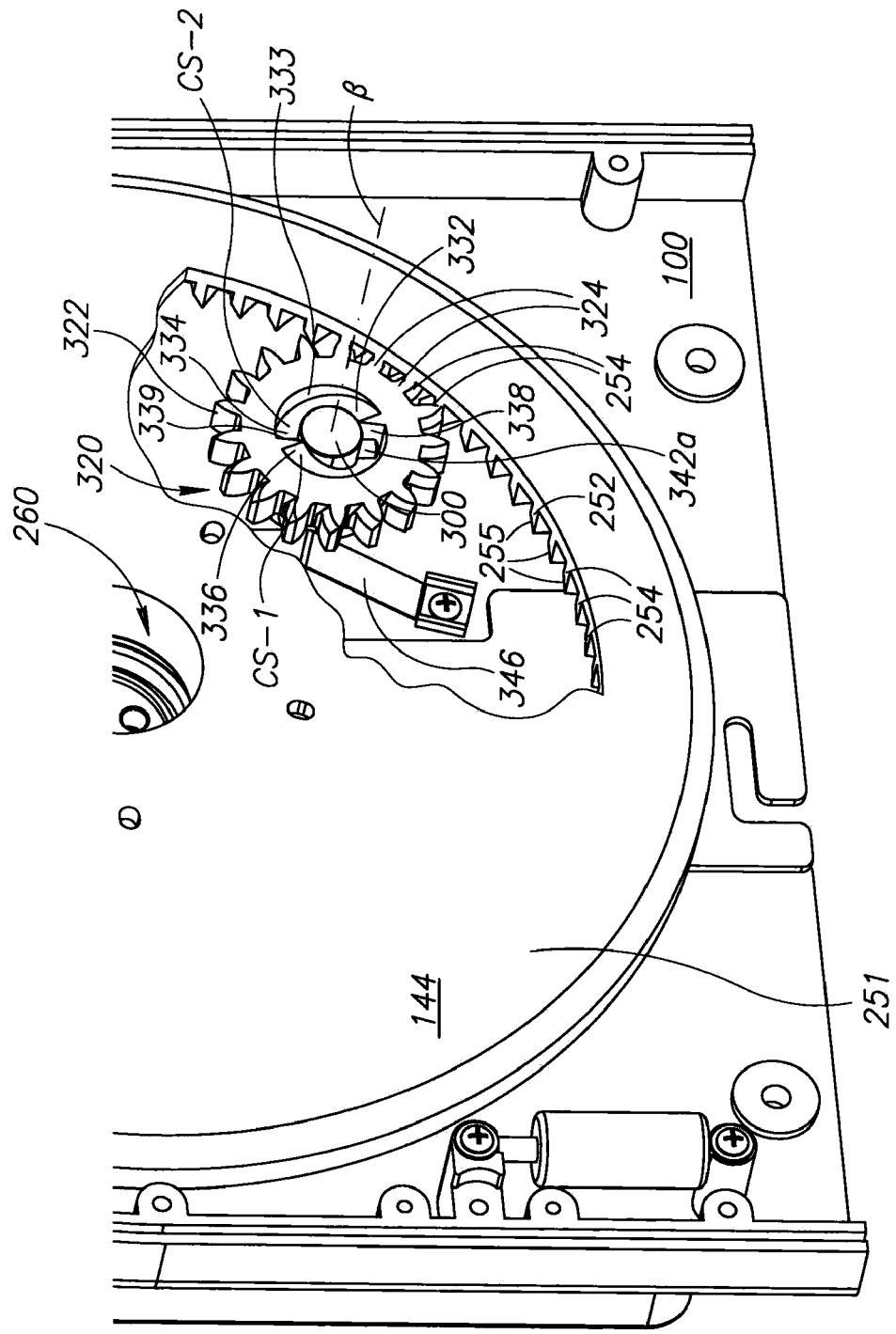

FIG. 8B is an enlarged fragmentary perspective view of the motor disengagement device of FIG. 7 from an opposite side with the drive assembly illustrated in the engaged position.

Figure 9A:
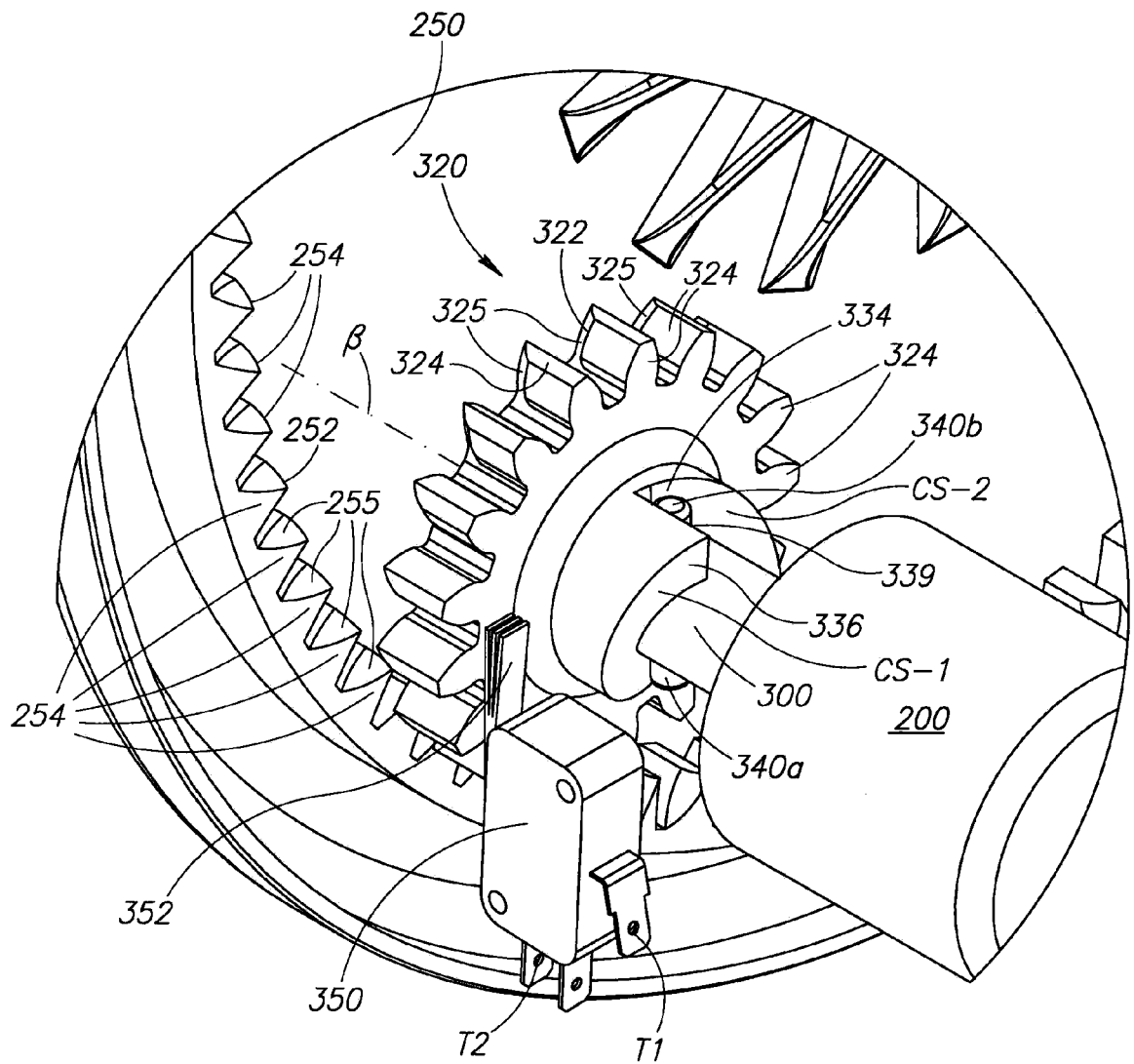

FIG. 9A is an enlarged fragmentary perspective view of the motor disengagement device of FIG. 7 with the drive assembly illustrated in the disengaged position.

Figure 9B:
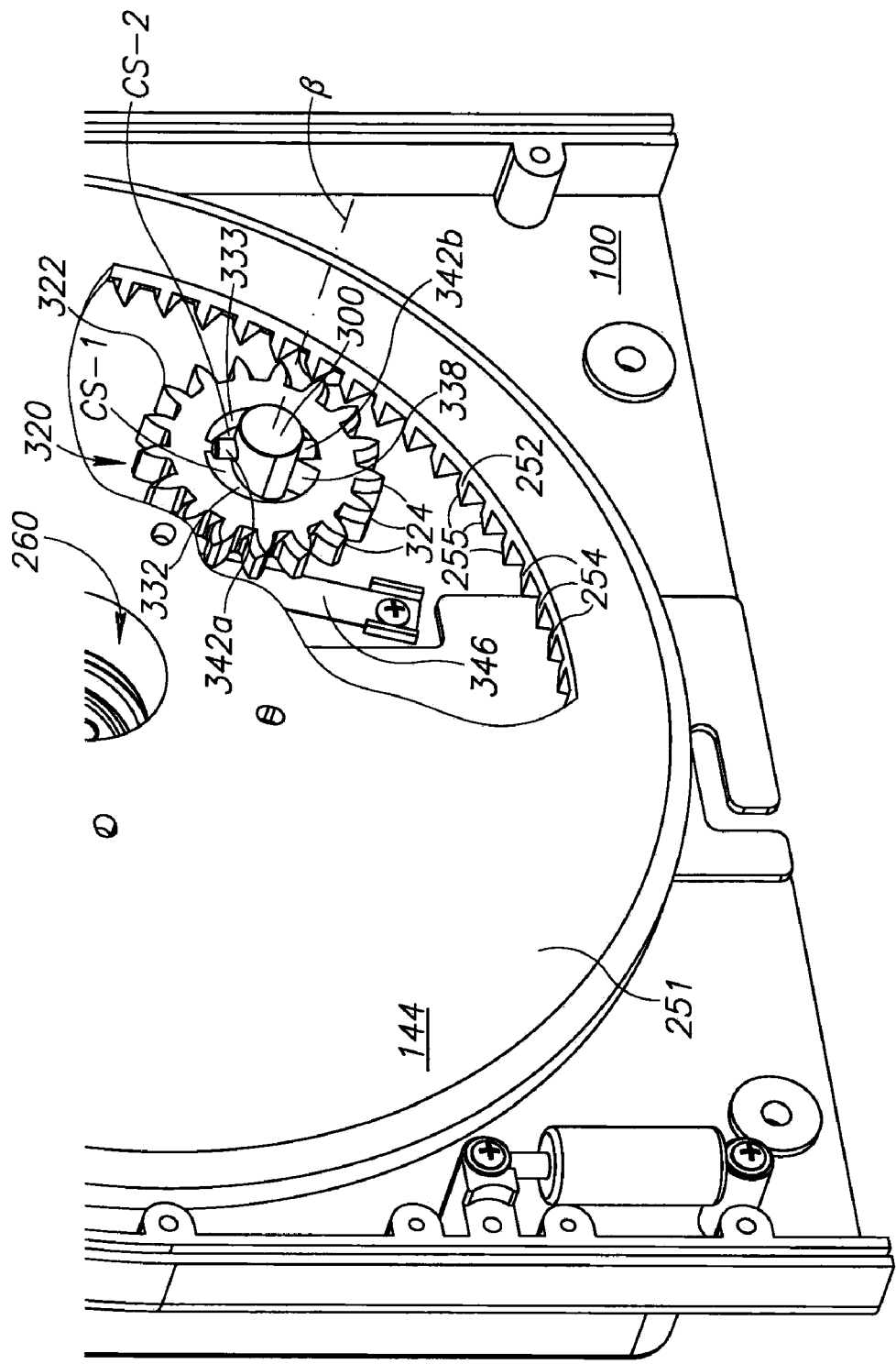

FIG. 9B is an enlarged fragmentary perspective view of the motor disengagement device of FIG. 7 from an opposite side with the drive assembly illustrated in the disengaged position.

Figure 10A:
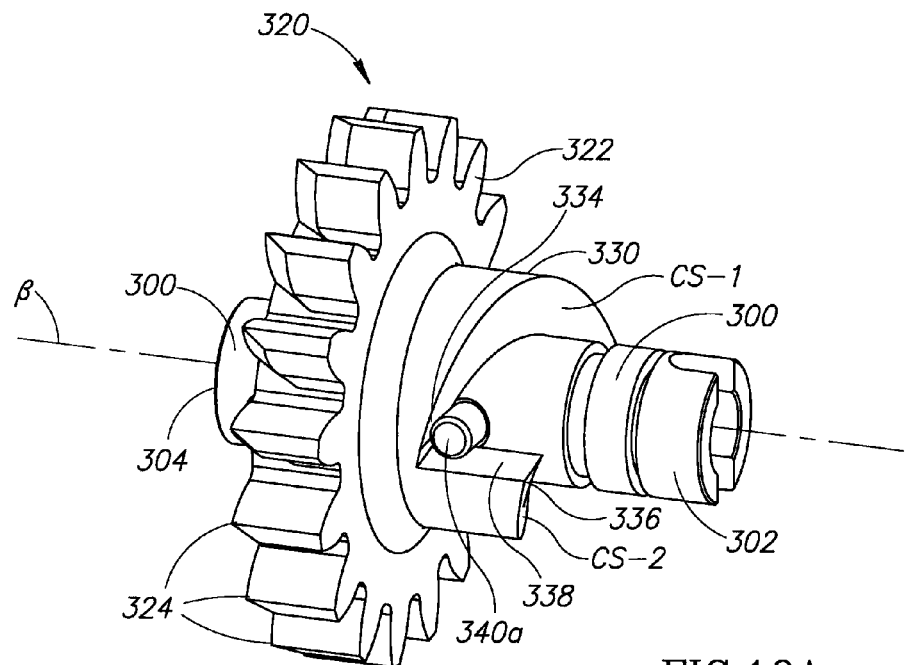

FIG. 10A is an enlarged perspective view of the drive assembly of FIG. 7 mounted on the drive shaft of the motor and located in the disengaged position along the drive shaft.

Figure 10B:
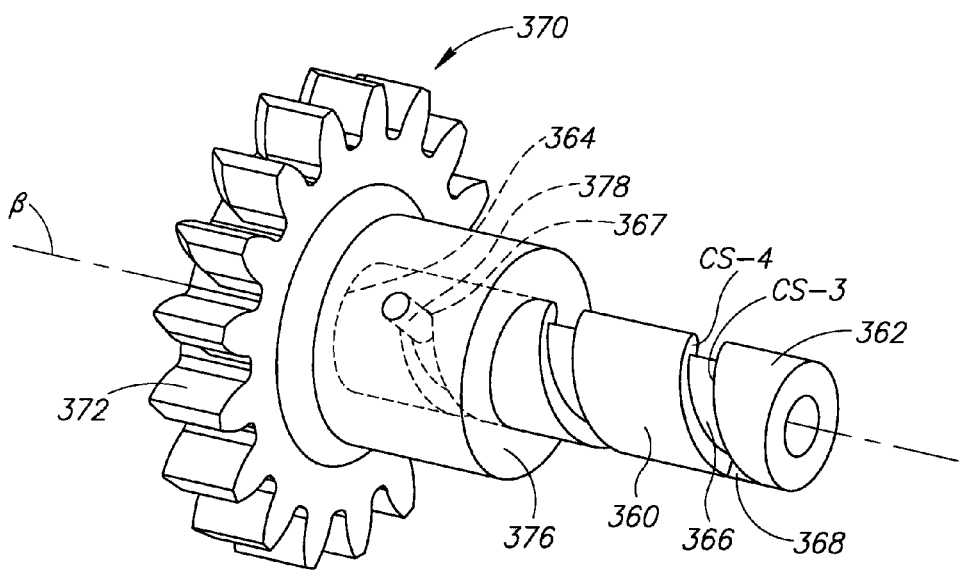

FIG. 10B is an enlarged perspective view of an alternate embodiment of a drive assembly mounted on an alternate embodiment of a drive shaft coupled to the motor and located in the engaged position along the drive shaft.

Figure 11:
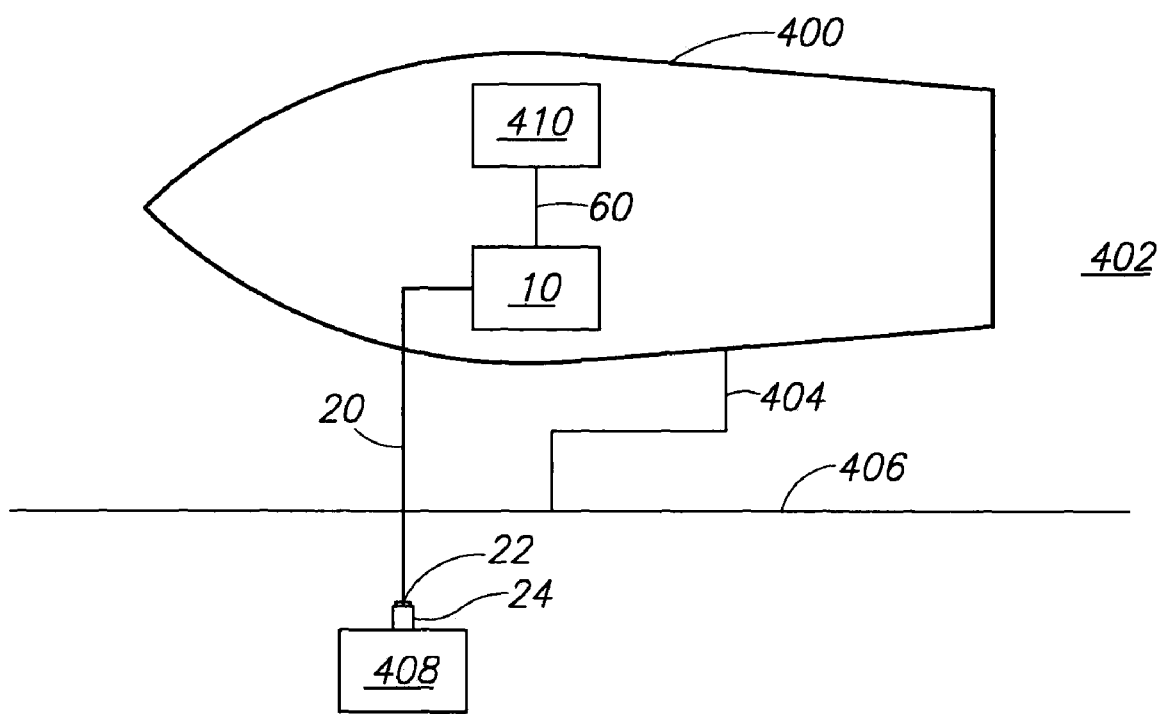

FIG. 11 is a schematic diagram of a system incorporating the cord reel of FIG. 1.

DETAILED DESCRIPTION OF THE INVENTION

Aspects of the present invention include a motor driven cord reel having a spool rotatable by a motor to wind a cord about the spool and a motor disengagement device for disengaging the motor from the spool allowing the cord to be manually pulled from the spool without encountering resistance from the motor. While the reel is described as being for use with an electrical cord, those of ordinary skill in the art appreciate that the reel may be used with any suitably flexible elongated structure, such as a hose (e.g., water hose, air hose, and the like), a rope, a chain, a cable, a section of tubing, a wire, a conduit, a section of fencing, a section of rebar, a section of banding, a strap, a sheet, and the like.

Figure 2:
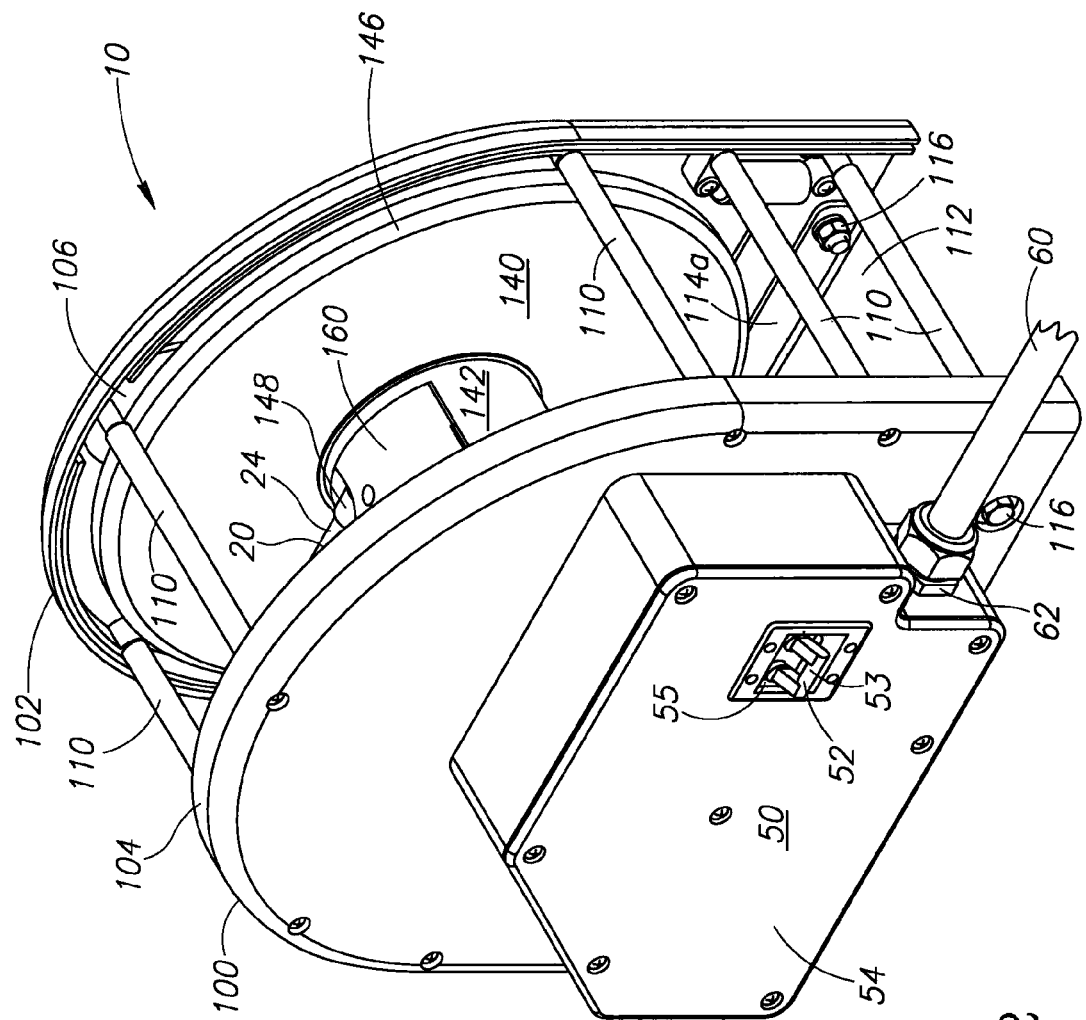
FIG. 2 is a perspective view of the cord reel of FIG. 1 depicted with its cover removed exposing a spool having a central portion about which a cord may be wound disposed between a pair of spaced apart flanges, the central portion of the spool including a cover plate covering an electrical connector.

FIG. 1 depicts a reel 10 configured to wind and store an electrical cord 20. At its distal end 22, the cord 20 includes a conventional electrical plug 23 configured to be coupled to a power source (not shown), such as a standard alternating current ("AC") outlet. Optionally, the reel 10 may include an outer housing or cover 30. For illustrative purposes, FIG. 2 depicts the reel 10 with the cover 30 removed and cord 20 completely unwound. A proximal end 24 of the cord 20 is coupled to the reel 10.

The reel 10 includes an inner housing 50 having a removable cover plate 54 with an aperture 55 formed therein. A dual pole circuit breaker 52 with a manual actuator portion 53 is mounted inside the housing 50 and the manual actuator portion 53 of the dual pole circuit breaker 52 extends through the aperture 55 formed in the cover plate 54 and is accessible to the user. The manual actuator portion 53 of the dual pole circuit breaker 52 is positionable in an "ON" position and an "OFF" position.

The reel 10 includes an electrical output 60, such as an electrical cord or connector. At least a portion of the power received by the reel 10 from the cord 20 is conducted through the housing 50 to the electrical output 60. In the embodiment depicted, the electrical output 60 is mechanically coupled to the housing 50 by a cord grip 62. In embodiments in which the electrical output 60 is an electrical connector (e.g., a plug), an external power cord (not shown) may be coupled to the connector and used to conduct power to an external electrical device (not shown), such as a vehicle. Alternatively, when as in the embodiment depicted, the electrical output 60 is an output cord, a distal end of the output cord (not shown) may be coupled to an external electrical device (not shown) and used to power that device. In some embodiments, the output cord may include an output plug (not shown) configured to be coupled to the external electrical device. Non-limiting examples of such an external electrical device include an AC system of a vehicle such as a recreational vehicle ("RV"), a boat, an industrial vehicle, an airplane, a railroad car, and the like. Exemplary industrial vehicles include service trucks (such as those used for yard maintenance), fire apparatus, and the like. By way of another example, the external electrical device may be a stationary device or piece of equipment temporarily or permanently installed at a fixed location.

The reel 10 includes two confronting spaced apart side supports 100 and 102. By way of a non-limiting example, the side supports 100 and 102 may be spaced apart about 4 inches to about 12 inches. The side supports 100 and 102 each have a perimeter portion 104 and 106, respectively. The side supports 100 and 102 are connected to one another along their perimeter portions 104 and 106, respectively, by a plurality of spaced apart transverse connecting members 110. Each of the side supports 100 and 102 may have a height of about 10 inches to about 20 inches. By way of a non-limiting example, the height of each of the side supports 100 and 102 may be about 14 inches. Each of the side supports 100 and 102 may have a length of about 10 inches to about 20 inches. By way of a non-limiting example, the height of each of the side supports 100 and 102 may be about 13.75 inches. In the embodiment illustrated in FIG. 2, the housing 50 is coupled to the side support 100.

A bottom plate 112 extends between the side supports 100 and 102. The bottom plate 112 may include a pair of opposing flanges 114a and 114b (see FIG. 4). Each of the flanges 114a and 114b is coupled to the one of the side supports 102 and 100, respectively, by fasteners 116.

Figure 3:
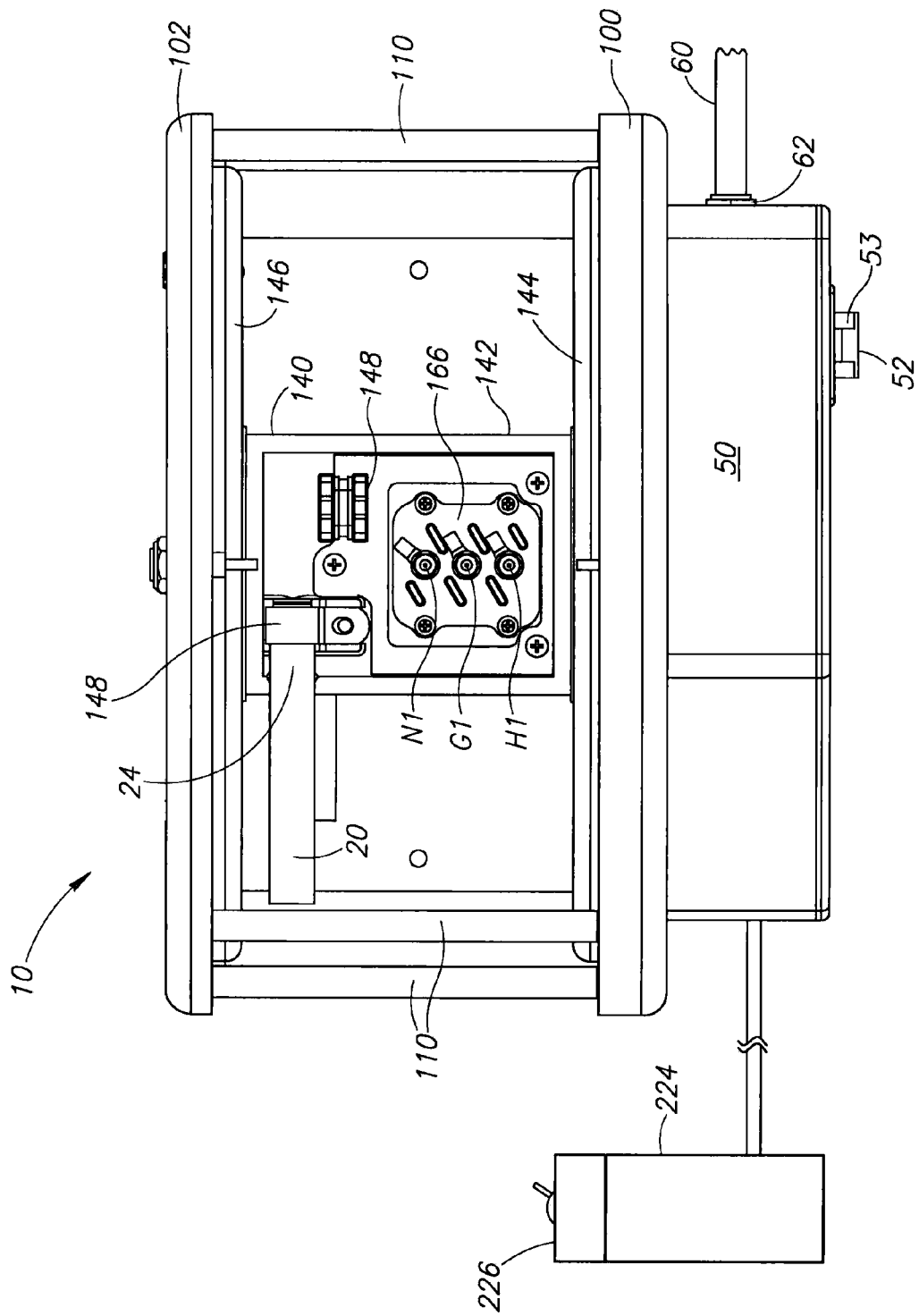
FIG. 3 is a top view of the cord reel of FIG. 1 depicted with its cover and the cover plate of the spool both removed, thereby exposing the electrical connector.

Referring to FIG. 3, a spool 140 is rotatably coupled between the side supports 100 and 102. The spool 140 has a hub or cord receiving central portion 142 positioned between a first side spool flange 144 (see FIG. 3) and a second side spool flange 146. The first and second side spool flanges 144 and 146 are adjacent the side supports 100 and 102, respectively.

The proximal end portion 24 of the cord 20 is coupled to the central portion 142 of the spool 140 by one or more couplers 148. Each of the couplers 148 may be constructed using any suitable hose or tubing coupler or clamp known in the art. A portion of the cord 20 between its distal end 22 (see FIG. 1) and its proximal end 24 may be wound around the central portion 142 of the spool 140 between the first and second side spool flanges 144 and 146 for storage. As desired, a length of the wound portion of the cord 20 may be unwound from the spool 140.

Returning to FIG. 2, a cover plate 160 is coupled to the central portion 142 where the proximal end portion 24 of the cord 20 is coupled to the spool 140. For illustrative purposes, the cover plate 160 has been removed in FIG. 3. Under the cover plate 160, the central portion 142 includes an electrical connector 166. In the embodiment depicted, the electrical connector 166 is located inside the central portion 142 of the spool 140 and is protected by the cover plate 160. Depending upon implementation details, the cord 20 may include three wires (not shown): a neutral wire, a ground wire, and a current carrying or hot wire. The electrical connector 166 has a contact corresponding to each of the wires of the cord 20: a contact "N1" (neutral), a contact "G1" (ground), and a contact "H1" (hot).

Figure 4:
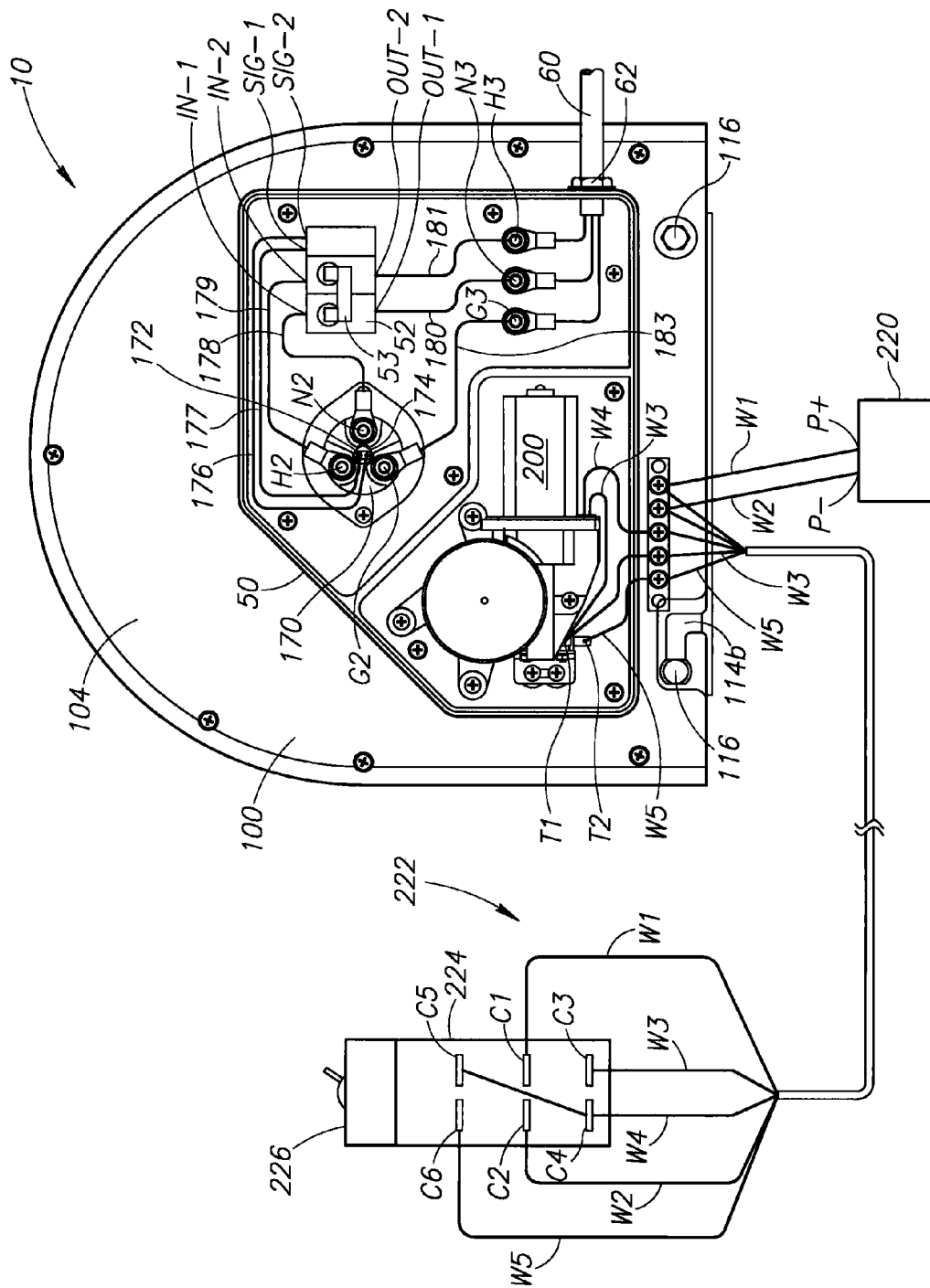
FIG. 4 is a schematic side view of the cord reel of FIG. 1 configured for use with a first embodiment of a circuit including dual pole single throw momentary control switch having a manually operated actuator.

For illustrative purposes, the cover plate 54 has been removed from the housing 50 in FIG. 4. Referring to FIGS. 3 and 4, the electrical connector 166 couples the proximal end portion 24 of the cord 20 to a slip ring assembly 170 that extends from inside the rotating central portion 142 of the spool 140 through the stationary side support 100 and into the housing 50. As is apparent to those of ordinary skill in the art, the slip ring assembly 170 includes a conductive ring (not shown) for each of the contacts "N1" (neutral), "G1" (ground), and "H1" (hot). The conductive ring is mounted on the rotating central portion 142 of the spool 140, rotates therewith, but is insulted therefrom. The contacts "N1" (neutral), "G1" (ground), and "H1" (hot) of the electrical connector 166 are each coupled to a corresponding one of the conductive rings.

Three contacts "N2" (neutral), "G2" (ground), and "H2" (hot) are mounted on the stationary side support 100 and in electrical communication with the slip ring assembly 170 conduct current from the slip ring assembly 170 to the electrical output 60. The contacts "N2" (neutral), "G2" (ground), and "H2" (hot) are electrically coupled to the conduct rings coupled to the contacts "N1" (neutral), "G1" (ground), and "H1" (hot), respectively. In the embodiment depicted, a thermal sensor 172 is located adjacent to a central portion 174 of the slip ring assembly 170. The thermal sensor 172 is configured to output an electrical signal reflecting a temperature in the central portion 174 of the slip ring assembly 170.

As may be viewed in FIG. 4, the dual pole circuit breaker 52 includes two input terminals "IN-1" and "IN-2" and two output terminals "OUT-1" and "OUT-2." The dual pole circuit breaker 52 is configured to conduct electrical current received at the first input terminal "IN-1" to the first output terminal "OUT-1." The dual pole circuit breaker 52 is also configured to conduct electrical current received at the second input terminal "IN-2" to the second output terminal "OUT-2." The dual pole circuit breaker 52 is also configured to detect whether the current at the first input terminal "IN-1" and/or the second input terminal "IN-2" exceeds a threshold value and if it does, open both electrical connections between the input terminals "IN-1" and "IN-2" and the output terminals "OUT-1" and "OUT-2," respectively.

The dual pole circuit breaker 52 may include a pair of electrical contacts "SIG-1" and "SIG-2" configured to receive an electrical signal indicating a temperature. The electrical signal output by the thermal sensor 172 may be conducted by electrical conductors 176 and 177 (e.g., wires) to the electrical contacts "SIG-1" and "SIG-2" of the dual pole circuit breaker 52. The dual pole circuit breaker 52 is configured to determine whether the electrical signal indicates the temperature exceeds a maximum threshold value and if it does, open both electrical connections between the input terminals "IN-1" and "IN-2" and the output terminals "OUT-1" and "OUT-2," respectively.

When both electrical connections are open, the manual actuator portion 53 of the dual pole circuit breaker 52 is positioned in an "OFF" or open circuit position. The user may manually close the open electrical connections by moving the manual actuator portion 53 to an "ON" or closed circuit position. Likewise, the user may open both connections by moving the manual actuator portion 53 to the "OFF" or open circuit position.

In the embodiment depicted, a first electrical conductor 178 (e.g., a wire) couples the contact "N2" (neutral) to the first input terminal "IN-1" of the dual pole circuit breaker 52 and a second electrical conductor 179 (e.g., a wire) couples the contact "H2" (hot) to the second input terminal "IN-2" of the dual pole circuit breaker 52.

Three contacts "N3" (neutral), "G3" (ground), and "H3" (hot) are mounted on the stationary side support 100. A third electrical conductor 180 is coupled between the first output terminal "OUT-1" of the dual pole circuit breaker 52 and the contact "N3" (neutral) and a fourth electrical conductor 181 is coupled between the second output terminal "OUT-2" of the dual pole circuit breaker 52 and the contact "H3" (hot). A fifth electrical conductor 183 couples the contact "G2" (ground) in electrical communication with the slip ring assembly 170 to the contact "G3" (ground). The electrical output 60 is coupled to the three contacts "N3" (neutral), "G3" (ground), and "H3" (hot).

In summary, referring to FIGS. 3 and 4, current is conducted by the cord 20 to the electrical connector 166, which conducts the current to the slip ring assembly 170. Current is subsequently conducted from the slip ring assembly 170 through the dual pole circuit breaker 52 and the contacts "N3" (neutral), and "H3" (hot) to the electrical output 60.

As mentioned above, the reel 10 is motor driven. Turning to FIG. 4, a motor 200 is coupled to the stationary side support 100. The motor 200 provides a rotary force used to rotate the spool 140 (see FIG. 2) in a first direction to wind the cord 20 about the central portion 142 of the spool. As will be described below, the motor 200 rotates in a second direction opposite the first direction to disengage the motor from the spool 140 allowing the user to rotate the spool in the second direction manually by pulling the cord 20.

Figure 5:
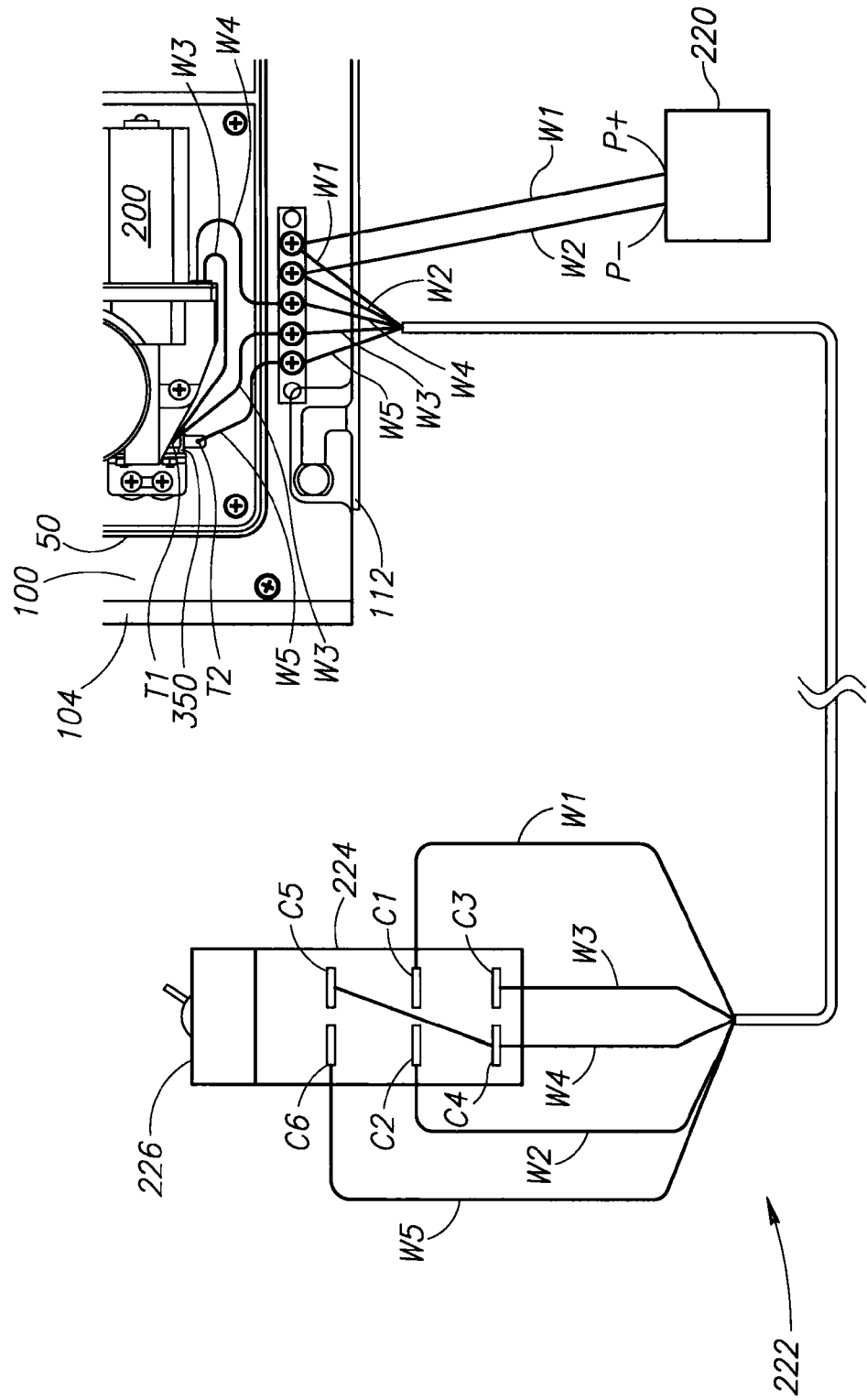
FIG. 5 is an enlarged view of the first embodiment of the circuit of FIG. 4.

In the embodiment depicted in FIGS. 4 and 5, the motor 200 is powered by a power source 220, such as a 12V direct current ("DC") battery. In the embodiment illustrated, the power source 220 has a positive contact "P+" and a negative contact "P−." Current is conducted by a circuit 222 from the power source 220 to the motor 200. The circuit 222 includes a control switch 224, which may be used by the user to actuate the motor 200. The control switch 224 may be located remotely from the power source 220 and/or the motor 200. The circuit 222 also includes a contact "T1" electrically coupled to a normally closed contact "T2." The control switch 224 illustrated in FIGS. 4 and 5 may be implemented as a Double-Pole Single-Throw ("DPST") momentary switch or any functional equivalent thereof. The control switch 224 includes six contacts: C1, C2, C3, C4, C5, and C6. The contacts "C3" and "C4" may be normally open and the contacts "C5" and "C6" may be normally closed. The positive contact "P+" of the power source 220 is coupled to the contact "C1" by a conductor "W1." The negative contact "P−" of the power source 220 is coupled to the contact "C2" by a conductor "W2."

The control switch 224 includes a mechanical or manual actuator 226. The manual actuator 226 is selectively positionable in an "ON" position and an "OFF" position. By way of an example, the manual actuator 226 may normally be in the "OFF" position. The user may manually and momentarily transition the manual actuator 226 to the "ON" position. The manual actuator 226 may be implemented as a momentary depressible button (not shown) that when depressed by the user is in the "ON" position. The button may automatically spring or otherwise transition from the "ON" position to the "OFF" position when no longer depressed by the user. In alternate embodiments, the manual actuator 226 may be implemented as a fixed position switch.

When the manual actuator 226 is in the "ON" position, the normally open contacts "C3" and "C4" are closed and the normally closed contacts "C5" and "C6" are opened. Further, the control switch 224 connects the contact "C1" with the contact "C3," conducting current from the power source 220 to the contact "C3." The contact "C3" is coupled to the contact "T1" by a conductor "W3." The conductor "W3" is also coupled to the motor 200 and conducts current thereto, causing the motor 200 to rotate in the first (wind) direction. Current passes through the motor 200 and exits therefrom via a conductor "W4." The conductor "W4" is coupled to the contact "C4" of the control switch 224. The control switch 224 couples the contact "C4" to the contact "C2," which directs the current to the conductor "W2" and back to the negative contact "P−" of the power source 220. Opening the contact "C6" prevents current from flowing in a conductor "W5" coupled between the contact "C6" and the contact "T2," thereby effectively opening the normally closed contact "T2."

When the manual actuator 226 is in the "OFF" position, the normally open contacts "C3" and "C4" are open and the normally closed contacts "C5" and "C6" are closed. Opening the contact "C3" prevents current from flowing in a conductor "W3" and closing the contact "C6" allows current to flow in conductor "W5." The control switch 224 connects the contact "C1" to the contact "C5," which is coupled to the conductor "W4." The conductor "W4" conducts current from the contact "C4" to the motor 200, causing the motor to rotate in the second (unwind) direction opposite the first (wind) direction. Current passes through the motor 200 and exits therefrom via conductor "W3," which is coupled to the contact "T1." Current passes through the contact "T1" to the contact "T2" and to the conductor "W5" coupled thereto. The conductor "W5" conducts the current to the contact "C6." The control switch 224 couples the contact "C6" to the contact "C2," which directs the current to the conductor "W2" and back to the negative contact "P−" of the power source 220. As described in detail below, when the motor 200 has operated in the second (unwind) direction for a sufficient amount of time, the connection between the contact "T1" and the contact "T2" is opened, opening the circuit 222, stopping the flow of current therethrough, and terminating the rotation of the motor 200.

Figure 6:
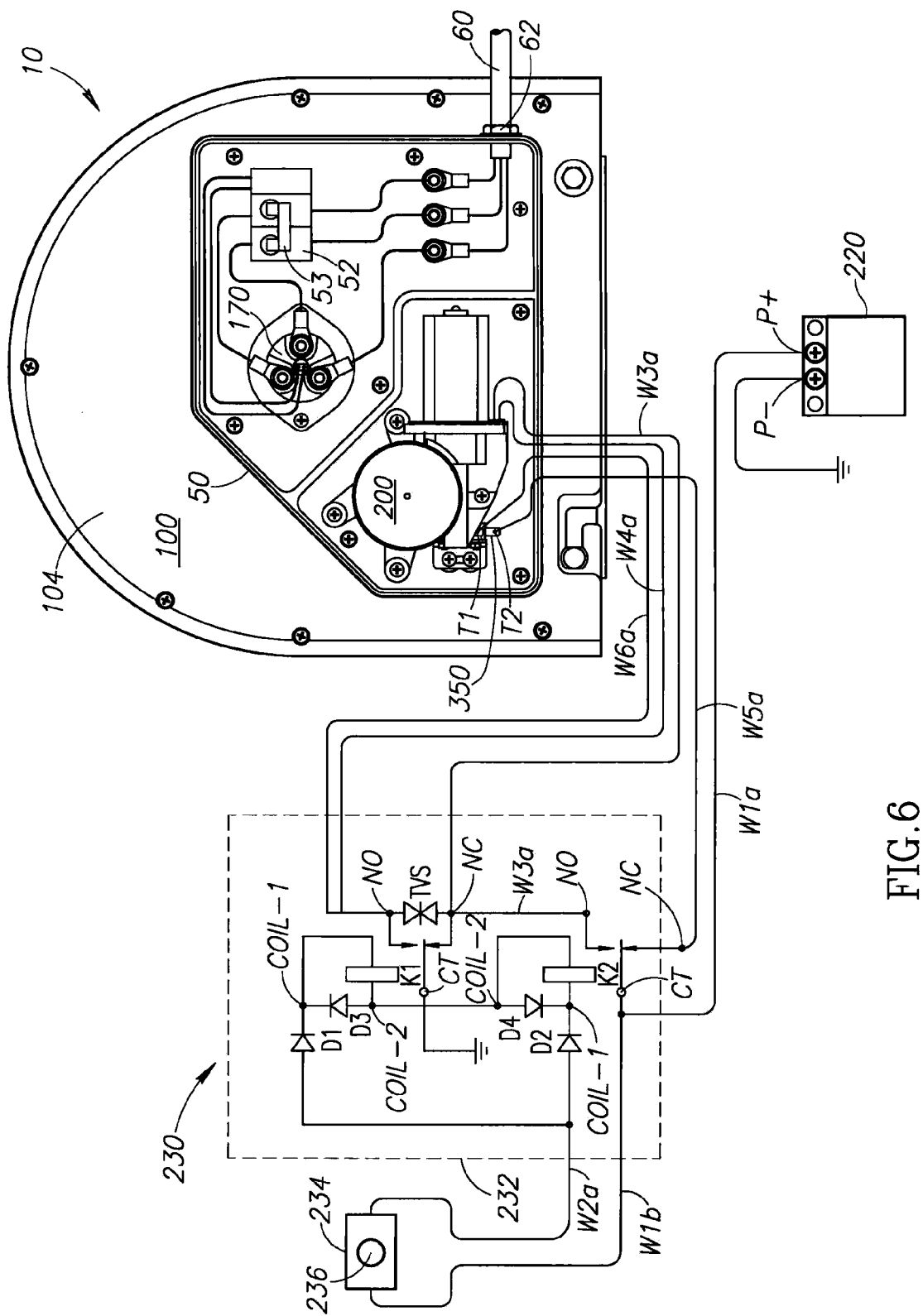
FIG. 6 is a schematic side view of the cord reel of FIG. 1 configured for use with a second embodiment of a circuit including a relay circuit and a manually actuated single pole single throw momentary control switch.

FIG. 6 depicts an alternate embodiment in which a relay circuit 230 is used to conduct current from the power source 220 to the motor 200. Optionally, the relay circuit 230 may be mounted on a circuit board 232. The relay circuit 230 includes a control switch 234 with a manual actuator 236 selectively positionable in an "ON" position and an "OFF" position. The control switch 234 may be implemented as a Single-Pole Single-Throw ("SPST") momentary switch or any functional equivalent thereof. As illustrated in FIG. 6, the manual actuator 236 may be implemented as a button depressible into in the "ON" position and configured to automatically spring or otherwise transition back to the "OFF" position when no longer depressed by the user.

The relay circuit 230 includes a first relay "K1," a second relay "K2," a transient voltage suppressor "TVS," and four diodes "D1," "D2," "D3," and "D4." The diodes "D1" and "D2" function as inverse voltage protection diodes. The diodes "D3" and "D4" provide relay coil reverse current suppression. The first and second relays "K1" and "K2" may each be implemented as Double Pole Single Throw ("DPDT") momentary switches, with each having a first coil contact "COIL-1," a second coil contact "COIL-2," a common contact "CT," a normally open contact "NO," and a normally closed contact "NC." The second coil contact "COIL-2" of both the first and second relays "K1" and "K2," is coupled to ground. The common contact "CT" of the first relay "K1" is coupled to ground. The negative contact "P−" of the power source 220 is coupled to ground. The positive contact "P+" of the power source 220 is coupled to the common contact "CT" of the second relay "K2" by a first conductor "W1a" and to the control switch 234 by a second conductor "W1b."

When the control switch 234 is in the "ON" position, current is conducted by the control switch via a conductor "W2a" to the relay circuit 230 where it flows through the diodes "D1" and "D2," and to the first coil contact "COIL-1" of each of the first and second relays "K1" and "K2." This flow of current opens the connection between the common contact "CT" and the normally closed contact "NC" and closes the connection between the common contact "CT" and the normally open contact "NO" of both the first and second relays "K1" and "K2." Current flows from the normally open contact "NO" of the second relay "K2" on a conductor "W3a" into the motor 200, actuating it in the first (wind) direction. Current exits the motor 200 via the conductor "W4a," which conducts the current to the normally open contact "NO" of the first relay "K1." The first relay "K1," directs the current to the common contact "CT," which is coupled to ground.

When the control switch 234 is in the "OFF" position, current is not conducted thereby to the relay circuit 230 and the first and second relays "K1" and "K2," are configured as illustrated. In other words, for both the first and second relays "K1" and "K2," the connection between the common contact "CT" and the normally closed contact "NC" is closed and the connection between the common contact "CT" and the normally open contact "NO" is open. Current flows through the conductor "W1a," and a conductor "W5a." The conductor "W5a" is coupled to the contact "T2," which is coupled to the contact "T1." Current flows from the contact "T1" into a conductor "W6a," then into the conductor "W4a," which directs the current into the motor 200 actuating it in the second (unwind) direction. Current exits the motor 200 via the conductor "W3a," which conducts the current to the normally closed contact "NC" of the first relay "K1." The first relay "K1," directs the current to the common contact "CT," which is coupled to ground. As described in detail below, when the motor 200 has operated in the second (unwind) direction for a sufficient amount of time, the connection between the contact "T1" and the contact "T2" is opened, stopping the flow of current therethrough and terminating the rotation of the motor.

In another alternate embodiment, a timer relay circuit (not shown) may be used to actuate the motor 200 in the second (unwind) direction after the expiration of a predetermined delay period starting when the control switch 234 is positioned to the "OFF" position. Alternatively, the timer relay circuit may actuate the motor 200 in the second (unwind) direction after the expiration of a predetermined delay period starting when the motor 200 stops rotating in the first (wind) direction. The timer relay circuit may be configured to actuate the motor 200 in the second (unwind) direction for a predetermined length of time (e.g., about 2 seconds to about 3 seconds). Then, the timer relay circuit may terminate the rotation of the motor 200.

The first side spool flange 144 of the spool 140 previously described is illustrated in greater detail in FIG. 7. The first side spool flange 144 rotates about an axis of rotation α. The first side spool flange 144 has an outside face 250 opposite an inside face 251 (see FIGS. 8B and 9B), the outside face 250 being adjacent to and spaced from the side support 100. The outside face 250 includes a ring gear 252 centered about the axis of rotation α and having a plurality of teeth 254 extending radially inwardly toward the axis of rotation α. Each of the teeth 254 has a chamfered or relieved edge portion 255.

The outside face 250 includes a second ring gear 256 centered about the axis of rotation α and having a plurality of teeth 258 extending radially outwardly away from the axis of rotation α. The second ring gear 256 mates with a corresponding inwardly extending teeth (not shown) of a link belt (not shown) non-rotatably coupled to the central portion 142 of the spool 140. Engagement between the teeth 258 of the second ring gear 256 and the corresponding teeth (not shown) of the link belt coupled to the central portion 142 translates the rotation of the first side spool flange 144 to the central portion, causes the central portion 142 to rotate with the first side spool flange 144 about the axis of rotation α. The central portion 142 is non-rotatably coupled to the second side spool flange 146 using any manner known in the art. Thus, when the first side spool flange 144 is rotated about the axis of rotation α, that rotation is translated to the central portion 142, which translates the rotation to the second side spool flange 146, and the entire spool 140 rotates as a single unit about the axis of rotation α.

An aperture 260 extends through the first side spool flange 144 along the axis of rotation α. Referring to FIG. 4, the aperture 260 is configured to receive the slip ring assembly 170 and allow it to be coupled between the electrical connector 166 (see FIG. 3) in the central portion 142 and the contacts "N2" (neutral), "G2" (ground), and "H2" (hot) coupled to the stationary side support 100.

The motor 200 is rotatably coupled to a drive shaft 300 and is operable to rotate the drive shaft 300 about an axis of rotation β in the first (wind) direction and in the second (unwind) direction. Referring to FIGS. 7 and 10A, in the embodiment illustrated, the drive shaft 300 has a proximal end portion 302 opposite a distal end portion 304. The motor 200 is coupled to the proximal end portion 302 of the drive shaft 300.

The motor 200 is drivingly connected to the spool 140 (see FIG. 2) and used to rotate the spool to wind the cord 20, but is not used to rotate the spool to unwind the cord. Instead, when the cord 20 is unwound, the motor 200 is drivingly disconnected from the spool 140 to allow the user to manually unwind the cord 20 by pulling on it in a direction away from the reel 10. When the drive shaft 300 is driven in the unwind direction, it is driven out of engagement with the spool 140 thereby allowing the spool to be rotated by the user unencumbered by the motor 200. Conversely, when the drive shaft 300 is driven in the first (wind) direction, it is first driven into engagement with the spool 140 thereby configuring the reel 10 to use the motor to wind the cord about the central portion 142 of the spool.

A drive assembly 320 is mounted on the drive shaft 300. The drive assembly 320 is movable along the axis of rotation β relative to the drive shaft 300 and hence toward the ring gear 252 of the first side spool flange 144. The drive assembly 320 is positionable along to the drive shaft 300 between an engaged position (see FIGS. 8A and 8B) and a disengaged position (see FIGS. 9A and 9B). The drive assembly 320 includes a drive gear 322 (such as a pinion gear) having a plurality of teeth 324 extending radially outwardly away from the axis of rotation β, a proximal cam member 330 (see FIGS. 8A, 9A, and 10A), and a distal cam member 332 (see FIGS. 8B and 9B). Each of the teeth 324 has a has a chamfered or relieved edge portion 325. In the embodiment illustrated, the distal cam member 332 is located inside a recessed hub portion 333 of the drive gear 322; however, this is not a requirement.

Each of the proximal and distal cam members 330 and 332 has one or more cam surfaces. In the embodiment illustrated, each of the proximal and distal cam members 330 and 332 has a first cam surface "CS-1" extended half way around the drive shaft 300 opposite a second first cam surface "CS-2" extending around the other half of the drive shaft 300. Referring to FIG. 10A, an enlarged perspective view of the drive assembly 320 and the drive shaft 300 disassembled from the reel 10 is provided. Each of the first and second cam surfaces "CS-1" and "CS-2" may be implemented as a helix or inclined plane having a first end portion 334 that is closer to the drive gear 322 along the axis of rotation β than a second end portion 336. The helix of the first and second cam surfaces "CS-1" and "CS-2" may be centered about the axis of rotation β. A helical direction is defined from the first end portion 334 to the second end portion 336 of the first and second cam surfaces "CS-1" and "CS-2." As is apparent to those of ordinary skill, the helical direction in which the first and second cam surfaces "CS-1" and "CS-2" extend along the drive shaft may be clock-wise or counterclockwise as viewed from the motor 200. In the embodiment depicted, the first and second cam surfaces "CS-1" and "CS-2" of the proximal cam member 330 extend along the drive shaft 300 in a clock-wise helical direction as viewed from the motor 200, and the first and second cam surfaces "CS-1" and "CS-2" of the distal cam member 332 extend along the drive shaft 300 in a counterclockwise helical direction as viewed from the motor 200.

In both the proximal and distal cam members 330 and 332, the first end portion 334 of the first cam surface "CS-1" is adjacent to the second end portion 336 of the second cam surface "CS-2," and the first end portion 334 of the second cam surface "CS-2" is adjacent to the second end portion 336 of the first cam surface "CS-1." The proximal and distal cam members 330 and 332 are arranged with the first cam surface "CS-1" of each equally spaced apart at all points along its length from the second cam surface "CS-2" of the other, and the first and second cam surfaces have the same slope.

A first stop portion 338 is defined by the intersection of the first end portion 334 of the first cam surface "CS-1" and the second end portion 336 of the second cam surface "CS-2," as shown in FIG. 8B for the distal cam member 332 and FIG. 10A for the proximal cam member 330. A second stop portion 339 is defined by the intersection of the first end portion 334 of the second cam surface "CS-2" and the second portion 336 of the first cam surface "CS-1," as shown in FIG. 8B for the distal cam member 332 and FIG. 8A for the proximal cam member 330.

The drive assembly 320 is disposed on the drive shaft 300 to travel along a portion of the drive shaft 300 located between at least one proximal cam follower and at least one distal cam follower. In the embodiment illustrated, the drive assembly 320 is mounted to the drive shaft 300 between a proximal pair of diametrically opposed first and second cam followers 340a and 340b (as shown in FIG. 9A), and a distal pair of diametrically opposed first and second cam followers 342a and 342b (as shown in FIG. 9B). In other words, the embodiment depicted includes a proximal cam follower for each of the cam surfaces "CS-1" and "CS-2" of the proximal cam member 330, and a distal cam follower for each of the cam surfaces "CS-1" and "CS-2" of the distal cam member 332. However, this is not a requirement and embodiments in which there are greater or fewer cam followers relative to the number of cam surfaces are also within the scope of the present teachings.

Each of the cam followers 340a, 340b, 342a, and 342b is coupled to the drive shaft 300 and is rotatable thereby about the axis of rotation β. However, in the embodiment depicted, the cam followers 340a, 340b, 342a, and 342b are fixedly attached to the drive shaft 300 and are not movable relative thereto. The first proximal cam follower 340a engages the first cam surface "CS-1" of the proximal cam member 330, the second proximal cam follower 340b engages the second cam surface "CS-2" of the proximal cam member 330, the first distal cam follower 342a engages the first cam surface "CS-1" of the distal cam member 332, and the second distal cam follower 342b engages the second cam surface "CS-2" of the distal cam member 332. The first proximal cam follower 340a and the second distal cam follower 342b are in radial alignment and spaced longitudinally apart on the drive shaft 300, and the second proximal cam follower 340b and the first distal cam follower 340a are in radial alignment and space longitudinally apart on the drive shaft 300. Each of the cam followers 340a, 340b, 342a, and 342b engages its respective cam surface from the first end portion 334 (see FIG. 10A) to the second end portion 336.

In the embodiment illustrated, each of the cam followers 340a, 340b, 342a, and 342b abuts its respective cam surface and remains in constant contact therewith. However, this is not a requirement, and as is appreciated by those of ordinary skill in the art, embodiments in which a gap (not shown) is defined between one or more of the cam followers 340a, 340b, 342a, and 342b and at least a portion of its respective cam surface(s) are within the scope the present teachings.

The distal cam followers 342a and 342b rotate the drive assembly 320 in the first (wind) direction by pressing against the stop portions 338 and 339 adjacent the intersections of the first and second cam surfaces "CS-1" and "CS-2" of the distal cam member 332 while the drive shaft 300 rotates in the first (wind) direction about the axis of rotation β. The proximal cam followers 340a and 340b may rotate the drive assembly 320 in the second (unwind) direction by pressing against the stop portions 338 and 339 adjacent the intersections of the first and second cam surfaces "CS-1" and "CS-2" of the proximal cam member 330 while the drive shaft 300 rotates in the second (unwind) direction about the axis of rotation β.

However, when the distal cam followers 342a and 342b are not pressing against the stop portions 338 and 339 of the first and second cam surfaces "CS-1" and "CS-2" of the proximal cam member 332 and the proximal cam followers 340a and 340b are not pressing against the stop portions 338 and 339 of the first and second cam surfaces "CS-1" and "CS-2" of the proximal cam member 330, rotation of the drive shaft 300 by the motor 200 provides no rotational drive to the drive assembly 320 but does move the drive assembly inward and outward along the drive shaft 300 between engaged position shown in FIGS. 8A and 8B, and the disengaged position shown in FIGS. 9A and 9B.

Any frictional engagement between the drive assembly 320 and the drive shaft 300 and/or a frictional engagement between the drive assembly 320 and the cam followers 340a, 340b, 342a, and 342b is insufficient to rotatably drive the drive shaft, and in the illustrated embodiment is offset by use of a deflectable rotation-resisting member 346 affixed to the side support 100 and configured to prevent the drive assembly 320 from rotating with the drive shaft 300 as the drive assembly is moved between the engaged and disengaged positions. In the embodiment illustrated, the rotation-resisting member 346 is implemented as a leaf spring configured to press against the drive gear 322 and resist its rotation by the drive shaft 300. The rotation-resisting member 346 may be configured to engage the drive assembly 320 when the drive assembly 320 is disengaged or less than fully engaged with the ring gear 252 of the first side spool flange 144. Further, the deflectable member 346 may be configured to disengage from the drive assembly 320 when the drive assembly 320 is fully or at least partially engaged with the ring gear 252 of the first side spool flange 144.

Turning to FIGS. 8A and 9A, the reel 10 may include a position indicating device 350 configured to determine when the drive assembly 320 is adequately disengaged from the ring gear 252 of the first side spool flange 144. As illustrated in FIG. 5, the position indicating device 350 may be coupled to the side support 100. Returning now to FIGS. 8A and 9A, the position indicating device 350 may be implemented as a limit switch, proximity switch, and the like. In the embodiment illustrated, the position indicating device 350 includes a deflection member 352 and includes the contacts "T1" and "T2." As explained above, the contact "T1" receives power from the power source 220 via various conductors depending upon the embodiment implemented. The connection between the contact "T1" and the contact "T2" is normally closed allowing current to flow therebetween. However, when the drive assembly 320 contacts the deflection member 352 of the position indicating device 350, the deflection member 352 is deflected by the drive assembly 320 causing the position indicating device 350 to open the connection between the contact "T1" and the contact "T2," thereby stopping the flow of current to the motor 200, and terminating rotation of the drive shaft 300 when the drive assembly is moved into the disengaged position.

Operation of the Motor Engagement/Disengagement Mechanism

At any time other than when it is desired to wind the cord 20 about the spool 140 thereby retracting the cord into the reel 10, the drive gear 322 of the drive assembly 320 is disengaged from the ring gear 252. In the configuration, the cord 20 may be freely pulled from the spool 140, without encountering resistance from the motor 200.

Referring to FIGS. 9A, 9B, 8A, and 8B, transitioning the drive assembly 320 from the disengaged position (see FIGS. 9A and 9B) to the engaged position (see FIGS. 8A and 8B) will now be described. In the disengaged position, the proximal cam follower 340a is adjacent to the first end portion 334 of the first cam surface "CS-1" of the proximal cam member 330. Further, the proximal cam follower 340a may abut the stop portion 338 of the proximal cam member 330. The proximal cam follower 340b is adjacent to the first end portion 334 of the second cam surface "CS-2" of the proximal cam member 330. Further, the proximal cam follower 340b may abut the stop portion 339 of the proximal cam member 330. The distal cam follower 342a is adjacent to the second end portion 336 of the first cam surface "CS-1" of the distal cam member 332 and the distal cam follower 342b is adjacent to the second end portion 336 of the second cam surface "CS-2" of the distal cam member 332.

When the user desires to wind the cord 20 about the spool 140 thereby retracting the cord back onto the reel 10, the user may place the control switch 226 (see FIG. 4) in the "ON" position or the control switch 234 (see FIG. 6) into the "ON" position depending upon the embodiment implemented, actuating the motor 200 in the first (wind) direction. When the motor 200 is actuated, it rotates the drive shaft 300 in the first (wind) direction about the axis of rotation β causing the followers 340a, 340b, 342a, and 342b to rotate along therewith. However, the drive assembly 320 is prevented from rotating with the rotating drive shaft 300 by the deflectable rotation-resisting member 346.

As the drive shaft 300 rotates in the first (wind) direction, the proximal cam follower 340a engages the first cam surface "CS-1" of the proximal cam member 330 traversing the first cam surface from its first end portion 334 (see FIG. 10A) to its second end portion 336, and the proximal cam follower 340b engages the second cam surface "CS-2" of the proximal cam member 330 traversing the second cam surface from its first end portion 334 to its second end portion 336. This engagement by the proximal cam followers 340a and 340b pushes the drive assembly 320 inward toward the engaged position. At the same time, the distal cam follower 342a engages the first cam surface "CS-1" of the distal cam member 332 traversing the first cam surface from its second end portion 336 to its first end portion 334, and the proximal cam follower 342b engages the second cam surface "CS-2" of the distal cam member 332 traversing the second cam surface from its second end portion 336 to its first end portion 334. The drive assembly 320 is trapped between the proximal and distal cam followers as the proximal cam followers push it inward.

The first and second cam surfaces "CS-1" and "CS-2" of the proximal cam member 330 translate the rotational force of the proximal cam followers 340a and 340b into a linearly directed force (illustrated by arrow "A") along the axis of rotation β. The inward linearly directed force pushes the drive assembly 320 inward along the drive shaft 300 away from the motor 200 and toward the first side spool flange 144 and eventually into meshing engagement of the drive gear 322 with the ring gear 252 of the first side spool flange 144.

If the teeth 324 of the drive gear 322 of the drive assembly 320 are not aligned with the teeth 254 of the ring gear 252 of the first side spool flange 144 when the drive assembly 320 is pushed toward engagement with the first side spool flange 144, the relieved edge portion 325 of the teeth 324 of the drive gear 322 may abut and slide along the relieved edge portion 255 of the teeth 254 of the ring gear 252 of the first side spool flange 144 causing the teeth 324 of the drive gear 322 to slide into meshing engagement with the teeth 254 of the ring gear 252. In this manner, the relieved edge portions 255 and 325 of the drive gear 322 and ring gear 252, respectively, guide the teeth 324 of the drive gear 322 into a meshing engagement with the teeth 254 of the ring gear 252 facilitating the transition of the drive assembly 320 from the disengaged position to the engaged position.

When the distal cam followers 342a and 342b abut the stop portions 338 and 339 of the distal cam member 332, the rotation of the distal cam followers 342a and 342b is translated to the drive assembly 320 causing it to rotate about the axis of rotation β, halting the inwardly directed linear movement of the drive assembly along the drive shaft 300 and beginning to provide rotational drive to the drive assembly.

After the inwardly directed linear movement of the drive assembly 320 has halted, the drive gear 322 of the drive assembly 320 is fully engaged with the ring gear 252 of the first side spool flange 144. The teeth 324 of the drive gear 322 engage the teeth 254 of the ring gear 252 of the first side spool flange 144 and cause the first side spool flange to rotate about the axis of rotation α in the first (wind) direction. Rotation of the first side spool flange 144 is translated to the spool 140, which rotates as a unit about the axis of rotation α in the first (wind) direction, winding the cord 20 about the central portion 142 of the spool 140.

As discussed above, in the engaged position, the proximal cam follower 340a is adjacent to the second end portion 336 of the first cam surface "CS-1" of the proximal cam member 330 and the proximal cam follower 340b is adjacent to the second end portion 336 of the second cam surface "CS-2" of the proximal cam member 330. The distal cam follower 342*a* is adjacent to the first end portion 334 of the first cam surface "CS-1" of the distal cam member 332 and abuts the stop portion 338 of the distal cam member 332, and the distal cam follower 342*b* is adjacent to the first end portion 334 of the second cam surface "CS-2" of the distal cam member 332 and abuts the stop portion 339 of the distal cam member.

When the user determines a sufficient amount of the cord 20 has been retracted, the user place the control switch 226 (see FIG. 4) in the "OFF" position or the control switch 234 (see FIG. 6) into the "OFF" position depending upon the embodiment implemented, thereby causing the motor 200 to rotate the drive shaft 300 in the second (unwind) direction. Rotating the drive shaft 300 about the axis of rotation β in the second (unwind) direction causes the followers 340*a*, 340*b*, 342*a*, and 342*b* to rotate in the second (unwind) direction. However, the drive assembly 320 is not rotated by the rotating drive shaft 300 because none of the followers 340*a*, 340*b*, 342*a*, and 342*b* are pressed against any one of the stop portions 338 and 339 of the proximal and distal cam members 330 and 332. Further, the drive assembly 320 may be prevented from rotating with the rotating drive shaft 300 by the deflectable rotation-resisting member 346.

As the drive shaft 300 rotates, the distal cam follower 342*a* engages the first cam surface "CS-1" of the distal cam member 330 traversing the first cam surface from its first end portion 334 to its second end portion 336. As it rotates, the proximal cam follower 342*b* engages the second cam surface "CS-2" of the distal cam member 332 traversing the second cam surface from its first end portion 334 to its second end portion 336. This engagement by the distal cam followers 342*a* and 342*b* pushes the drive assembly 320 outward toward the disengaged position. At the same time, the proximal cam follower 340*a* engages the first cam surface "CS-1" of the proximal cam member 330 traversing the first cam surface from its second end portion 336 to its first end portion 334. As it rotates, the proximal cam follower 340*b* engages the second cam surface "CS-2" of the proximal cam member 330 traversing the first cam surface from its second end portion 336 to its first end portion 334. The drive assembly 320 is trapped between the distal and proximal cam followers as the distal cam followers push it outward.

The first and second cam surfaces "CS-1" and "CS-2" of the distal cam member 332 translate the rotational force of the distal cam followers 342*a* and 342*b* into a linearly directed force (opposite the direction illustrated by arrow "A") along the axis of rotation β. The outward linearly directed force pushes the drive assembly 320 away from the first side spool flange 144 and toward the proximal cam followers 340*a* and 340*b* and the motor 200. The outward linearly directed force pushes the drive assembly 320 outward along the drive shaft 300 toward the motor 200 and away from the engaged position causing disengagement of the drive gear 322 from the ring gear 252 of the first side spool flange 144.

When the drive assembly 320 reaches the disengaged position, which may be considered a "home" or "resting" position, the drive gear 322 contacts the deflection member 352 of the position indicating device 350, which interrupts the flow of electrical current to the motor 200, thereby causing the motor to stop rotating the drive shaft 300. When the drive shaft 300 stops rotating, the outwardly directed linear movement of the drive assembly along the drive shaft is terminated. If the proximal cam followers 340*a* and 340*b* abut the stop portions 338 and 339 of the proximal cam member 330 before the position indicating device 350 turns off the motor 200, the rotation of the proximal cam followers 340*a* and 340*b* will simply cause the disengaged drive assembly 320 to rotate harmlessly about the axis of rotation β.

After the outwardly directed linear movement of the drive assembly 320 has halted, the drive gear 322 of the drive assembly 320 is sufficiently spaced from the ring gear 252 of the first side spool flange 144 to avoid engagement between the teeth 324 of the drive gear 322 and the teeth 254 of the ring gear 252 of the first side spool flange 144. Thus, when the user pulls on the cord 20 causing the spool 140 to rotate about the axis of rotation α in the second (unwind) direction, the motor 200 is not back driven and does not resist the manual rotation of the spool 140 by the user.

FIG. 10B illustrates an alternate embodiment of the drive assembly 320 (see FIG. 10A) and the drive shaft 300 (see FIG. 10A) that may be used to construct the reel 10. Turning to FIG. 10B, a drive shaft 360 includes a proximal end portion 362 opposite a distal end portion 364, and a groove 366. The motor 200 (see FIGS. 8A and 9A) is rotatably coupled to the proximal end portion 362 of the drive shaft 360 and is operable to rotate the drive shaft 360 about the axis of rotation β in the first (wind) direction and in the second (unwind) direction.

The groove 366 is defined between a pair of opposing and substantially parallel cam surfaces "CS-3" and "CS-4." In the embodiment depicted in FIG. 10B, the groove 366 has a helical shape; however, this is not a requirement. The groove 366 terminates at a stop wall 367 extending between the cam surfaces "CS-3" and "CS-4." The stop wall 367 is adjacent to and spaced from the distal end portion 364 of the drive shaft 360. Optionally, the groove 366 includes a stop wall 368 that is opposite the stop wall 367 and extends between the cam surfaces "CS-3" and "CS-4." The stop wall 368 is adjacent to and spaced from the proximal end portion 362 of the drive shaft 360.

A drive assembly 370 includes a drive gear 372 substantially similar to the drive gear 322 (see FIG. 10A) of the drive assembly 320 configured to mesh with the ring gear 252 of the first side spool flange 144. The drive assembly 370 includes a collar portion 376 non-rotatably coupled to the drive gear 372. The collar portion 376 is disposed around the drive shaft 360 and is rotatable relative thereto. The collar portion 376 includes an inwardly extending projection 378 disposed inside the groove 366 between the cam surfaces "CS-3" and "CS-4." In FIG. 10B, the inwardly extending projection 378 is illustrated as a pin. However, the inwardly extending projection 378 may have alternate shapes including a helical shape configured to mesh with and move within the groove 366.

When the drive shaft 360 is rotated by the motor 200, the inwardly extending projection 378 acts as a cam follower engaging one or both of the cam surfaces "CS-3" and "CS-4." Rotation of the drive shaft 360 by the motor 200 provides no rotational drive to the drive assembly 370 but does move the drive assembly inward and outward along the drive shaft 360 between the engaged position, and the disengaged position. As described above with respect to the drive assembly 320, the deflectable rotation-resisting member 346 (see FIGS. 8B and 9B) may be affixed to the side support 100 and used to prevent the drive assembly 370 from rotating with the drive shaft 360 as the drive assembly is moved between the engaged and disengaged positions.

When the drive shaft 360 is rotated about the axis of rotation β in the first (wind) direction, the cam surface "CS-3" exerts a linearly directed force on the inwardly extending projection 378 that pushes the inwardly extending projection 378 away from the motor 200 thereby pushing the drive assembly 370 along the drive shaft 360 toward the ring gear 252 of the first side spool flange 144 and into the engaged position. Movement of the drive assembly 370 along the drive shaft 360 toward the ring gear 252 halts when the inwardly extending projection 378 abuts the stop wall 367 of the groove 366. When inwardly extending projection 378 abuts the stop wall 367, the rotation of the drive shaft 360 is translated to the drive assembly 370 causing it to rotate about the axis of rotation β, halting the inwardly directed linear movement of the drive assembly along the drive shaft 360 and beginning to provide rotational drive to the drive assembly.

After the inwardly directed linear movement of the drive assembly 370 has halted, the drive gear 372 of the drive assembly 370 is fully engaged with the ring gear 252 of the first side spool flange 144 and causes the first side spool flange 144 to rotate about the axis of rotation α in the first (wind) direction. Rotation of the first side spool flange 144 is translated to the spool 140, which rotates as a unit about the axis of rotation α in the first (wind) direction, winding the cord 20 about the central portion 142 of the spool 140.

When the drive shaft 360 is rotated about the axis of rotation β in the second (unwind) direction, the cam surface "CS-4" exerts a linearly directed force on the inwardly extending projection 378 that pushes the inwardly extending projection 378 toward the motor 200 thereby pushing the drive assembly 370 along the drive shaft 360 away from the ring gear 252 of the first side spool flange 144 and into the disengaged position. Thus, the linearly directed force exerted by the cam surface "CS-4" on the inwardly extending projection 378 when the drive shaft 360 is rotated in the second (unwind) direction is opposite the linearly directed force exerted by the cam surface "CS-3" on the inwardly extending projection 378 when the drive shaft 360 is rotated in the first (wind) direction.

Movement of the drive assembly 370 along the drive shaft 360 away from the ring gear 252 may be halted by the position indicating device 350 (see FIGS. 8A and 9A) in substantially the same manner the position indicating device 350 halts the movement of the drive assembly 320 (described above). Optionally, when the drive assembly 370 is in the disengaged position, the inwardly extending projection 378 may abut the stop wall 368; however, this is not a requirement.

As described above, the electrical output 60 may be coupled to an external electrical device, such as a vehicle including an industrial vehicle, RV, boat, and the like. FIG. 11 provides a schematic diagram of a boat 400 floating in a body of water 402 and docked at a dock 404 connected to a shore 406 having a standard shore power electrical outlet 408. The boat 400 has an onboard electrical system 410 coupled to the electrical output 60 of the reel 10. When the boat 400 is docked, its onboard electrical system 410 is coupled to the electrical outlet 408 by the conventional electrical plug 23 coupled to the distal end 22 of the cord 20. The cord 20 conducts power from the plug 23 at is distal end 22 to the reel 10, which conducts the power to the electrical output 60 coupled to the onboard electrical system 410 of the boat 400.

When the cord 20 is no longer needed, for example, when the boat 400 prepares to leave the dock 404, the cord 20 may be disconnected from the onshore electrical outlet 408 and wound around the reel 10. Depending upon the embodiment implemented, this is accomplished by depressing the control switch 226 (see FIG. 4) placing it in the "ON" position or depressing the control switch 234 (see FIG. 6) placing it in the "ON" position, causing the motor 200 to rotate in the first (wind) direction. When the motor 200 is rotated in the first (wind) direction, the drive assembly 320 moves into engagement with the ring gear 252 of the first side spool flange 144. If the user continues depressing the control switch 226 or the control switch 234 after the drive assembly 320 engages the ring gear 252, the motor 200 continues to rotate, rotating the drive assembly 320, which rotates the first side spool flange 144, which in turn rotates the spool 140 as a unit, and winds the cord 20 about the central portion 142 of the spool for storage. When the user stops depressing the control switch 226 or the control switch 234, the motor 200 automatically rotates in the opposite direction until the drive assembly 320 disengages from the ring gear 252 of the first side spool flange 144, readying the reel 10 for the next time the user desires to manually unwind the cord 20 from the reel 10 without encountering resistance from the motor 200.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A reel comprising:
   a spool rotatable about a first axis of rotation, the spool comprising a driven gear;
   a drive shaft comprising a proximal cam follower and a distal cam follower;
   a motor coupled to the drive shaft, the motor being configured to rotate the drive shaft in a first direction and a second direction about a second axis of rotation, the second direction being opposite the first direction; and
   a drive assembly disposed on the drive shaft, rotation of the drive shaft in the first direction moving the drive assembly along the drive shaft and into driving engagement with the spool, rotation of the drive shaft in the second direction moving the drive assembly along the drive shaft and out of driving engagement with the spool, the drive assembly being configured to rotate the spool about the first axis of rotation when in driving engagement therewith, the drive assembly comprising:
   a proximal cam surface centered about and extending along the second axis of rotation in one of a clockwise direction and a counterclockwise direction, the proximal cam follower of the drive shaft being adjacent the proximal cam surface, the proximal cam follower being configured to engage the proximal cam surface when the drive shaft is rotated by the motor in the first direction about the second axis of rotation, the proximal cam surface being configured to translate the rotation of the proximal cam follower into a first linearly directed force along the second axis of rotation, and move the drive assembly along the drive shaft and into driving engagement with the spool;
   a distal cam surface centered about and extending along the second axis of rotation in the other of the clock-wise direction and the counter-clock-wise direction, the distal cam follower of the drive shaft being adjacent the distal cam surface, the proximal cam surface being spaced from the distal cam surface along the drive shaft, the distal cam follower being configured to engage the distal cam surface when the drive shaft is rotated by the motor in the second direction about the second axis of rotation, the distal cam surface being configured to translate the rotation of the distal cam follower into a second linearly directed force along the second axis of rotation, the second linearly directed force being opposite the first linearly directed force, and move the drive assembly along the drive shaft and out of driving engagement with the spool; and
   a drive gear positioned between the proximal cam surface and the distal cam surface along the second axis of rotation, the drive gear being configured to be rotatably driven by the drive shaft when the drive assembly is in driving engagement with the spool, the driven gear of the spool being configured to mesh with the drive gear when the drive assembly is in driving engagement with the spool and translate the rotation of the drive gear in rotation of the spool.

2. The reel of claim 1, wherein the driven gear of the spool comprises a ring gear centered about the first axis of rotation, and
   the drive gear of the drive assembly is configured to engage the ring gear of the spool when the drive assembly is in driving engagement with the spool and the drive gear is further configured to disengage from the ring gear when the drive assembly is out of driving engagement with the spool.

3. The reel of claim 2 for use with an electrical cord, wherein the spool comprises a central portion about which the cord may be wound and a flange with the ring gear coupled to the flange.

4. The reel of claim 1 for use with a power source, further comprising:
   a circuit couplable to electrically connect the motor to the power source, the circuit comprising a control switch configured to determine selectively in which of the first direction and the second direction the motor rotates the drive shaft about the second axis of rotation.

5. The reel of claim 1 for use with a power source, further comprising:
   a circuit couplable to electrically connect the motor to the power source, the circuit comprising a control switch having a first position and a second position,
   when the control switch is in the first position, the circuit being configured to cause the motor to rotate the drive shaft in the first direction about the second axis of rotation to move the drive assembly along the drive shaft and into driving engagement with the spool, and
   when the control switch is in the second position, the circuit being configured to cause the motor to rotate the drive shaft in the second direction about the second axis of rotation to move the drive assembly along the drive shaft and out of driving engagement with the spool.

6. The reel of claim 1, further comprising a position indicator configured to:
   detect when the drive assembly is out of driving engagement with the spool, and
   after detecting the drive assembly is out of driving engagement with the spool, halt the rotation of the drive shaft in the second direction.

7. The reel of claim 1 for use with a power source and further comprising an electrical cord having a distal end portion opposite a proximal end portion, the distal end portion being couplable to the power source, wherein the spool comprises an electrical connector coupled to the proximal end portion of the electrical cord, and the reel further comprises:
   an electrical output electrically coupled to the electrical connector of the spool, the electrical connector being configured to receive electric power from the proximal end portion of the electrical cord and conduct it to the electrical output.

8. The reel of claim 1, further comprising a flexible elongated structure having a free end portion opposite a tethered end portion, the tethered end portion of the flexible elongated structure being coupled to the spool, and rotation the spool about the first axis of rotation winding the flexible elongated structure about the spool.

9. The reel of claim 1, further comprising:
   a rotation resisting member configured to resist rotation of the drive assembly about the drive shaft when the drive assembly is out of driving engagement with the spool.

10. The reel of claim 1, wherein the drive assembly comprises a stop portion,
    the drive assembly being configured for the first linearly directed force moving the drive assembly along the drive shaft and into driving engagement with the spool to move the distal cam follower into a position abutting the stop portion, and
    when the distal cam follower is in the position abutting the stop portion, continued rotation of the drive shaft in the first direction applies a drive force from the distal cam follower to the stop portion causing the drive assembly to rotate in the first direction about the second axis of rotation and thereby rotate the spool about the first axis of rotation.

11. The reel of claim 1, further including a detector arranged to detect when the second linearly directed force moves the drive assembly along the drive shaft into a position out of driving engagement with the spool and terminate further rotation of the drive shaft in the second direction about the second axis of rotation, thereby halting the movement of the drive assembly along the drive shaft.

12. The reel of claim 1, wherein the first proximal cam surface has a helical shape and the distal cam surface has a helical shape.

13. A reel comprising:
a spool rotatable about a first axis of rotation;
a drive shaft comprising a first proximal cam follower, a second proximal cam follower, a first distal cam follower, and a second distal proximal cam follower;
a motor coupled to the drive shaft, the motor being configured to rotate the drive shaft in a first direction and a second direction about a second axis of rotation, the second direction being opposite the first direction; and
a drive assembly disposed on the drive shaft, rotation of the drive shaft in the first direction moving the drive assembly along the drive shaft and into driving engagement with the spool, rotation of the drive shaft in the second direction moving the drive assembly along the drive shaft and out of driving engagement with the spool, the drive assembly being configured to rotate the spool about the first axis of rotation when in driving engagement therewith, the drive assembly comprising:
a proximal cam member having a first helical cam surface and a second helical cam surface, the first and second helical cam surfaces of the proximal cam member being centered about and extending along the second axis of rotation in one of a clockwise direction and a counterclockwise direction, and
a distal cam member having a first helical cam surface and a second helical cam surface, the first and second helical cam surfaces of the distal cam member being centered about and extending along the second axis of rotation in the other of the clockwise direction and the counterclockwise direction, the proximal cam member being spaced from the distal cam member along the drive shaft,
the first proximal cam follower of the drive shaft being adjacent the first helical cam surface of the proximal cam member, the second proximal cam follower of the drive shaft being adjacent the second helical cam surface of the proximal cam member, the first distal cam follower of the drive shaft being adjacent the first helical cam surface of the distal cam member, and the second distal proximal cam follower of the drive shaft being adjacent the second helical cam surface of the distal cam member,
the first proximal cam follower being configured to engage the first helical cam surface of the proximal cam member and the second proximal cam follower being configured to engage the second helical cam surface of the proximal cam member when the drive shaft is rotated by the motor in the first direction,
the first distal cam follower being configured to engage the first helical cam surface of the distal cam member and the second distal proximal cam follower being configured to engage the second helical cam surface of the distal cam member when the drive shaft is rotated by the motor in the second direction,
when the drive shaft is rotated by the motor in the first direction about the second axis of rotation, the first helical cam surface of the proximal cam member being configured to translate the rotation of the first proximal cam follower into a first linearly directed force along the second axis of rotation and the second helical cam surface of the proximal cam member being configured to translate the rotation of the second proximal cam follower into a second linearly directed force along the second axis of rotation, with the first and second linearly directed forces moving the drive assembly along the drive shaft and into driving engagement with the spool, and
when the drive shaft is rotated by the motor in the second direction about the second axis of rotation, the first helical cam surface of the distal cam member being configured to translate the rotation of the first distal cam follower into a third linearly directed force along the second axis of rotation and the second helical cam surface of the distal cam member being configured to translate the rotation of the second distal cam follower into a fourth linearly directed force along the second axis of rotation, the third and fourth linearly directed forces being opposite the first and second linearly directed forces, with the third and fourth linearly directed forces moving the drive assembly along the drive shaft and out of driving engagement with the spool.

14. The reel of claim 13, wherein the spool comprises a driven gear, and
the drive assembly further comprises a drive gear configured to be rotatably driven by the drive shaft when the drive assembly is in driving engagement with the spool, the driven gear of the spool being configured to mesh with the drive gear when the drive assembly is in driving engagement with the spool and translate the rotation of the drive gear in rotation of the spool.

15. The reel of claim 14, wherein the driven gear of the spool comprises a ring gear centered about the first axis of rotation, and
the drive gear of the drive assembly is configured to engage the ring gear of the spool when the drive assembly is in driving engagement with the spool and the drive gear is further configured to disengage from the ring gear when the drive assembly is out of driving engagement with the spool.

16. The reel of claim 15 for use with an electrical cord, wherein the spool comprises a central portion about which the cord may be wound and a flange with the ring gear coupled to the flange.

17. The reel of claim 13 for use with a power source, further comprising:
a circuit couplable to electrically connect the motor to the power source, the circuit comprising a control switch configured to determine selectively in which of the first direction and the second direction the motor rotates the drive shaft about the second axis of rotation.

18. The reel of claim 13 for use with a power source, further comprising:
a circuit couplable to electrically connect the motor to the power source, the circuit comprising a control switch having a first position and a second position,
when the control switch is in the first position, the circuit being configured to cause the motor to rotate the drive shaft in the first direction about the second axis of rotation to move the drive assembly along the drive shaft and into driving engagement with the spool, and
when the control switch is in the second position, the circuit being configured to cause the motor to rotate the drive shaft in the second direction about the second axis of rotation to move the drive assembly along the drive shaft and out of driving engagement with the spool.

19. The reel of claim 13, further comprising a position indicator configured to:
   detect when the drive assembly is out of driving engagement with the spool, and
   after detecting the drive assembly is out of driving engagement with the spool, halt the rotation of the drive shaft in the second direction.

20. The reel of claim 13 for use with a power source and further comprising an electrical cord having a distal end portion opposite a proximal end portion, the distal end portion being couplable to the power source, wherein the spool comprises an electrical connector coupled to the proximal end portion of the electrical cord, and the reel further comprises:
   an electrical output electrically coupled to the electrical connector of the spool, the electrical connector being configured to receive electric power from the proximal end portion of the electrical cord and conduct it to the electrical output.

21. The reel of claim 13, further comprising a flexible elongated structure having a free end portion opposite a tethered end portion, the tethered end portion of the flexible elongated structure being coupled to the spool, and rotation the spool about the first axis of rotation winding the flexible elongated structure about the spool.

22. The reel of claim 13, further comprising:
   a rotation resisting member configured to resist rotation of the drive assembly about the drive shaft when the drive assembly is out of driving engagement with the spool.

23. The reel of claim 13, wherein the distal cam member has a first distal stop portion and a second distal stop portion,
   the drive assembly being configured for the first and second linearly directed forces moving the drive assembly along the drive shaft and into driving engagement with the spool to move the first distal cam follower into a position abutting the first distal stop portion and to move the second distal cam follower into a position abutting the second distal stop portion, and
   when the first distal cam follower is in the position abutting the first distal stop portion and the second distal cam follower is in the position abutting the second distal stop portion, continued rotation of the drive shaft in the first direction applies a drive force from the first and second distal cam followers to the first and second distal stop portions, respectively, causing the drive assembly to rotate in the first direction about the second axis of rotation and thereby rotate the spool about the first axis of rotation.

24. The reel of claim 13, further including a detector arranged to detect when the third and fourth linearly directed forces move the drive assembly along the drive shaft into a position out of driving engagement with the spool and terminate further rotation of the drive shaft in the second direction about the second axis of rotation, thereby halting the movement of the drive assembly along the drive shaft.

\* \* \* \* \*